(12) United States Patent
Burnette et al.

(10) Patent No.: US 9,888,053 B2
(45) Date of Patent: Feb. 6, 2018

(54) SYSTEMS AND METHODS FOR CONDITIONAL DOWNLOAD USING IDLE NETWORK CAPACITY

(71) Applicant: Opanga Networks, Inc., Seattle, WA (US)

(72) Inventors: John Burnette, Seattle, WA (US); Ben Hadorn, Seattle, WA (US); Jeffrey Harrang, Seattle, WA (US); Giles Westerfield, Seattle, WA (US); David Gibbons, Seattle, WA (US)

(73) Assignee: OPANGA NETWORKS, INC., Seattle, WA (US)

( * ) Notice: Subject to any disclaimer, the term of this patent is extended or adjusted under 35 U.S.C. 154(b) by 231 days.

(21) Appl. No.: 14/832,934

(22) Filed: Aug. 21, 2015

(65) Prior Publication Data

US 2016/0065642 A1     Mar. 3, 2016

Related U.S. Application Data

(60) Provisional application No. 62/041,855, filed on Aug. 26, 2014.

(51) Int. Cl.
| | | |
|---|---|---|
| *G06F 15/16* | (2006.01) | |
| *H04L 29/06* | (2006.01) | |
| *H04L 29/08* | (2006.01) | |
| *H04N 21/238* | (2011.01) | |

(52) U.S. Cl.
CPC ............ *H04L 65/608* (2013.01); *H04L 67/06* (2013.01); *H04L 67/14* (2013.01); *H04N 21/238* (2013.01); *H04L 67/02* (2013.01)

(58) Field of Classification Search
CPC .. H04L 29/06; H04L 29/08072; H04L 21/238
USPC ............... 709/203, 220, 224, 228, 231, 232; 707/609; 725/90
See application file for complete search history.

(56) References Cited

U.S. PATENT DOCUMENTS

| | | | | |
|---|---|---|---|---|
| 5,918,020 A | * | 6/1999 | Blackard | H04L 47/10 370/395.62 |
| 8,826,340 B2 | * | 9/2014 | Ciciora | H04N 21/44008 725/109 |
| 8,924,643 B2 | * | 12/2014 | Lai | G06F 3/0625 386/239 |
| 9,414,248 B2 | * | 8/2016 | Kovvali | H04W 24/08 |

(Continued)

FOREIGN PATENT DOCUMENTS

JP         2007-67521 A       3/2007

OTHER PUBLICATIONS

International Search Report and Written Opinion for PCT/US2015/046396, dated Nov. 26, 2015.

*Primary Examiner* — Khanh Dinh

(57) ABSTRACT

Systems and methods for downloading data by conditionally using idle network capacity are described. In some embodiments, the systems and methods downloads into a buffer a first portion of media content in accordance with a first content streaming mode that permits downloading of media content data even when there is no idle network capacity, and upon determining that the buffer has been filled to a threshold level, downloads into the buffer a second portion of the media content in accordance with a second content streaming mode that permits downloading of media content data, e.g., only when there is idle network capacity.

20 Claims, 15 Drawing Sheets

(56) References Cited

U.S. PATENT DOCUMENTS

| | | | |
|---|---|---|---|
| 2003/0023745 A1* | 1/2003 | Noe | H04L 29/06 |
| | | | 709/235 |
| 2009/0292819 A1 | 11/2009 | Kandekar et al. | |
| 2010/0121970 A1* | 5/2010 | Roos | H04N 7/17318 |
| | | | 709/231 |
| 2010/0198943 A1 | 8/2010 | Harrang et al. | |
| 2013/0173758 A1 | 7/2013 | Park et al. | |
| 2014/0136643 A1 | 5/2014 | Aerrabotu | |
| 2014/0269269 A1* | 9/2014 | Kovvali | H04W 24/08 |
| | | | 370/229 |
| 2015/0113219 A1* | 4/2015 | Lai | G06F 3/0625 |
| | | | 711/118 |
| 2016/0277474 A1* | 9/2016 | Ljung | H04L 65/80 |

* cited by examiner

**270\* Content Download System**

272 Content Request Transmission Component

274 Buffer Fill Level Determination Component

276 Buffer Size Control Component

278 Network Idle Capacity Determination Component

280 Triggering Event Detection Component

FIG. 2C

SYSTEMS AND METHODS FOR CONDITIONAL DOWNLOAD USING IDLE NETWORK CAPACITY

CROSS-REFERENCES TO RELATED APPLICATIONS

This application claims priority to U.S. Provisional Application No. 62/041,855, filed on Aug. 26, 2014, which is incorporated by reference.

BACKGROUND

Streaming online content while connected to a network is a popular method of delivering requested media content from networked servers for consumption by a content consumer. One common problem often encountered with streaming online content is that the network connecting, for example, a content server and a receiving system (e.g., a desktop computer or a mobile device such as a Smartphone or tablet computer) associated with a content consumer may have transient fluctuations in its ability to deliver the content, resulting in interruptions in the streaming of the media content, and the disruption of consumption (which may also be referred to herein as "playback") of the content. Various methods have been proposed to mitigate this issue including content compression to reduce the delivery rate, dynamic real-time encoding to reduce the delivery rate/playback-quality to match the network capability, and pre-buffering a short segment of the content before allowing consumption to start and thereafter attempting to fill the buffer faster than the content can be consumed. This last streaming method has become known as progressive download (or "PD"), and the technique is intended to build up a safety margin in order to be able to maintain continuous playback during brief intervals when the server is unable to maintain the delivery rate to the receiver over the network.

While designed to reduce and avoid interruptions, progressive download is not immune to network impairments which persist long enough to empty a buffer on a system receiving the content. In those cases, the playback session is forced to halt until the buffer can again be re-filled and the session recommences. It is therefore a common experience that existing progressive download techniques often fail to provide a continuous playback session depending on the capabilities of the network.

Another growing problem is the impact that streaming large content files has on data networks (which may include wireless, wired, and/or fiber networks). "Large" media content has the signature feature of consuming significant amounts of time and network resources during its delivery to or from an end user device. Commonly, consumer access networks are designed for delivery of short bursts of data and network resource use and are not intended for long-term continuous use such as streaming media content (e.g., audio, video, and/or other types of content data). Streaming media content is widely acknowledged to be a principal challenge to network traffic engineers who try to satisfy the peak use demands of many users with limited network resources. The typical outcome of widespread streaming adoption is network congestion which often is exhibited by slow network response for all users and their applications.

During peak periods of network usage (e.g., when a large volume of media content and/or other types of data are being transmitted over the network), the ability of the network to quickly and efficiently relay data from one network system to another network system becomes severely degraded. That is, as more and more network users connect to the network to download large amounts of data, the competition for the finite amount of available network bandwidth and resources (e.g., routers, servers, databases, and so forth) invariably results in each network user experiencing degraded services (e.g., slower upload and download speeds and data streaming interruptions).

SUMMARY

Systems and methods for downloading data by conditionally using idle network capacity are described. In some embodiments, the systems and methods downloads into a buffer a first portion of media content in accordance with a first content streaming mode that permits downloading of media content data even when there is no idle network capacity, and upon determining that the buffer has been filled to a threshold level, downloads into the buffer a second portion of the media content in accordance with a second content streaming mode that permits downloading of media content data only when there is idle network capacity. In some embodiments, the systems and methods, upon determining that the buffer has been filled to the threshold level or to another threshold level will permit consumption (e.g., playback) of the media content data already stored in the buffer.

For example, in some embodiments the systems and methods may initially download media content data using a first content streaming mode, which in some cases, may be a conventional streaming (CS) mode for downloading media content data in order to provide sufficient safety margin so that when playback of the already downloaded media begins there is no playback stall as result of streaming disruptions. As the buffer is being filled using the first content streaming mode, the fill level of the buffer may be continuously monitored. When the fill level reaches a certain threshold level (e.g., predefined threshold level), the systems and methods may resume downloading of the media content data in accordance with a second content streaming mode (which may also be referred to herein as "network savings mode") that permits downloading of media content data only when there is idle network capacity.

BRIEF DESCRIPTION OF THE DRAWINGS

FIG. 2C is a block diagram illustrating various components that may be included in the component download system 270* of FIGS. 2A and 2B.

DETAILED DESCRIPTION

Figure 1:
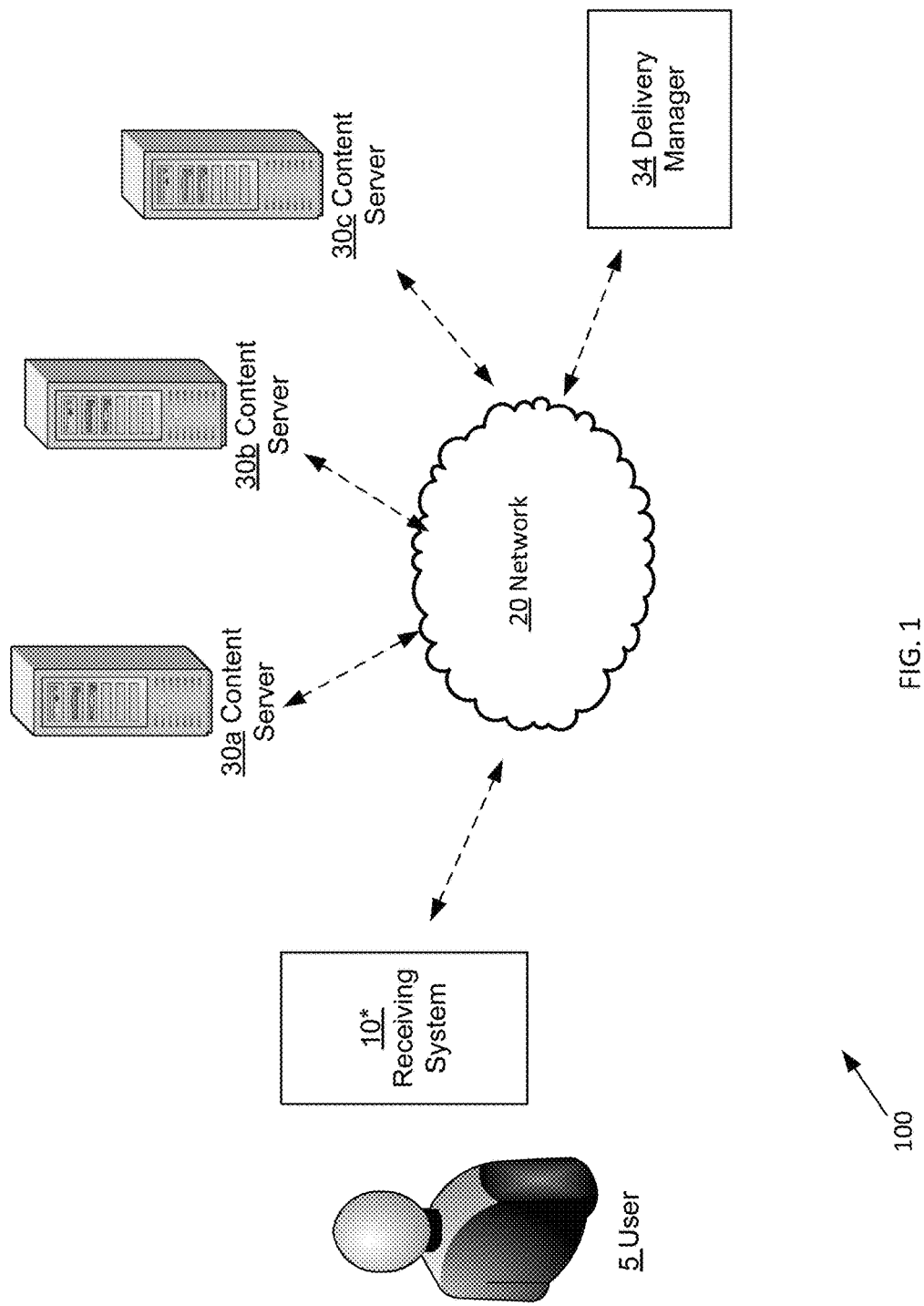
FIG. 1 is a block diagram illustrating an exemplary network environment.

Systems and methods for downloading data, which in some cases may be media content data, by conditionally using idle network capacity, are described. In various embodiments, the systems and methods may download from a network and into a buffer a first portion of media content file in accordance with a first content streaming mode that permits downloading of media content data even when there is no idle network capacity, determine that the buffer has been filled to a threshold level, and upon making such a determination, download from the network and into the buffer a second portion of the media content in accordance with a second content streaming mode that permits downloading of media content data when there is idle network capacity. For these embodiments, the systems and methods may be designed to determine various network conditions including, for example, whether there is idle network capacity. In various embodiments, the systems and methods may be implemented at a receiving system (e.g., a laptop or desktop computer, a mobile device such as a Smartphone, a PDA, or a tablet computer, a plurality of network devices, and so forth).

In an exemplary scenario, a user (e.g., a consumer) is associated with a receiving system that includes a system, which may be referred herein as a "content download system," that is configured to deliver/download media content to the receiving system. In various embodiments, the content download system may be able to determine network conditions including whether there is idle network capacity (e.g., unused bandwidth and/or network resources). When the user selects (via, for example, a web browser) a particular media content file (e.g., a digital copy of a movie) for consumption, the content download system may transmit a request to access/receive the media content file that is located at a remote content server. In response to the request the remote content server may begin streaming media content data to the receiving system in accordance with, for example, a conventional streaming (CS) protocol or mode (e.g., such a CS protocol may mandate a fair share strategy among users for network resources). The received media content data may then be stored into a buffer. Upon the buffer fill level reaching a first threshold level, the content download system may permit consumption of the media content data that have already been downloaded into the buffer. Upon the buffer fill level being detected as reaching a second threshold level (which, in some cases, may be the same as the first threshold level), the media content data may be streamed or downloaded into the buffer in accordance with a network saving mode that permits downloading of media content data only when there is idle network capacity. The content download system may continue downloading the media content data in accordance with the network saving mode until the media content file has been completely downloaded or until a triggering event (e.g., if there is no idle network capacity or if the buffer fill level falls to an unacceptable level) is detected as occurring in which case, the downloading of the media content data may resume in accordance with an expedited delivery mode. In some cases, the expedited delivery mode may be a CS mode or some other type of expedited delivery mode. The media content data may continue to be downloaded until the media content file has been completely downloaded or another trigger event occurs in which case the downloading of the media content data may be in accordance with the network savings mode.

The term "idle network capacity" (e.g., "surplus capacity" or "network savings mode") is understood to mean shared network capacity (e.g., network bandwidth, network resources) that may be used by, for example, the content download system for transferring portions or all of the streaming content data over a network, but in the absence of the content download system is otherwise unused. In other words if the network capacity is X and the current aggregate network traffic load is Y, then the available surplus capacity is X–Y where Y cannot be larger than X. The goal of network savings mode is to use some or all of the surplus capacity X–Y to transfer streaming content, which implies that if the surplus capacity (X–Y) is zero, then the transfer slows or stops and yields the channel to other users traffic sharing the channel. In some scenarios surplus network capacity in shared multi-user data networks is transient and can fluctuate randomly from moment to moment. Further, use of surplus as defined is distinct from a fair-share or similar competitive shared use of network capacity (e.g., when the aggregate traffic load exceeds the network capacity limit X, then each of N users sharing the network receives a X/N share of the network capacity).

The systems and methods in accordance with various embodiments may in some versions be implemented as an executable software module (e.g., media player app) running on a user device. Embodiments relate to the methods and systems including a media player application that provides functionality and user interfaces described here, in order to affect the flow rate and transfer methods of streaming content media from a remote content server, through an interconnecting data network, into memory storage on the user terminal, and presented to a user.

As described previously, the systems and methods may initially call for filling the buffer using conventional streaming protocol (which may only require fair-share strategy). The purpose of initially filling the buffer, using conventional streaming means, is to allow playback (e.g., media consumption) with a locally delivered portion of the video file already established so that (if the delivery rate of media content into the buffer cannot keep up with the playback consumption rate of the media player running on the user terminal) then the buffer can act as a local content reservoir to supply streaming content at the required playback rate until the delivery rate again maintains or exceeds the playback rate. Ordinarily the initial buffer fill threshold is selected to achieve the goal of uninterrupted playback by bridging transient intervals of slow network delivery. This threshold may be selected based on heuristic rules depending on current network type, past streaming session performance, current network streaming performance, past user behavior, or combinations of these factors. If this goal (e.g., maintaining downloading stream—delivery rate—at or above playback rate) cannot be met, then the buffer fill level may drain to zero, the media playback session "stalls" and the presentation to the user stops.

Once the initial buffer is established (e.g., buffer fill level has reached the initial buffer fill threshold) the playback begins as with conventional streaming and the user begins to see the streamed media presentation. Next, as the playback proceeds, the buffer continues to build in conventional streaming mode until a second buffer fill level is reached. In an embodiment, the second buffer fill level is predefined based on the network saving mode session logic. This second buffer fill level threshold may also be selected based on heuristic rules depending on network type, past streaming session performance, current network performance, past user behavior, or combinations of these factors.

Once the second buffer fill level is reached, the systems and methods in accordance with various embodiments switches into network savings mode to deliver the rest of the content file (or until the user aborts the playback session). In some scenarios, e.g., depending on the network performance and target streaming stall rate, the first and second buffer fill points may coincide as previously described. In some cases, the systems and methods may switch out of the network savings mode into an expedited delivery mode when a triggering event is detected as occurring as will be further described herein.

In network saving mode, the data being downloaded may be downloaded as quickly as the network allows whenever there is no congestion (e.g., when there is idle network capacity). This is in contrast to a conventional streaming mode that slows the delivery pace (after the initial buffer fill) in order to match or be near the playback rate (to not get too far ahead of the playback point in the file), but the value of the slower rate is independent of the actual network capability to deliver content at the slower rate.

In some embodiments, the systems and methods may increase the maximum size of a buffer in order to accommodate, for example, foreseeable network congestion that will invariably result in no idle network capacity. That is, ordinarily, slower delivery using only surplus capacity could translate to more stalling, but in some embodiments, the systems and methods compensate by permitting the max buffer size to grow (larger than conventional streaming) before pausing to let the playback catch up. This allows the buffer to rapidly fill up when the network is uncongested and continue uninterrupted playback in those moments when congestion occurs. There are at least two embodiments, in one embodiment there is unlimited buffer size (e.g. max buffer size equal to the remaining undelivered file portion or simply the entire file size) and in another embodiment a threshold maximum buffer size limit is enforced. In the latter case whenever the maximum buffer size is reached, the file delivery pauses to enforce the buffer size limit. In the former case the maximum buffer size is unconstrained and the buffer size may grow until the entire file is buffered, or the session is terminated, or the available storage space on the user device (e.g., receiving system) is exhausted.

In some embodiments, there may be other actions taken in scenarios where the buffer fill level (after engaging network savings mode) dips for example to below the second fill threshold, the first fill threshold, or to zero (stall), or decreases at a rate where these thresholds may soon be reached. In these scenarios (e.g. due to persistent network congestion) the network or content server is unable to keep pace with the playback consumption rate from the buffer by the user's media player. If triggered by occurrence of a triggering event (e.g., by the buffer fill level dipping to a lower threshold or fill level decreasing faster than a threshold negative rate), the systems and methods may transition out of the network savings mode into an expedited delivery mode operation in a proactive attempt to prevent a playback stall.

In some embodiments, an expedited delivery mode may be implemented by transferring streaming media via conventional streaming, for example, using the session's fair-share of the available network capacity and thereby competing for resources whether the network is congested (e.g., has no idle bandwidth) or not. In other embodiments, however, expedited delivery mode may be implemented by reducing the congestion-back off aggressiveness of the surplus capacity transport method so that transfer of the streaming media could compete for resources more aggressively than with network savings mode (e.g., faster delivery) but less than a fair-share strategy. In still other embodiments, expedited delivery may also use methods of adaptive bit-rate downshifting or similar methods to lower-quality media and thereby decrease the media delivery rate. In still other embodiments, expedited delivery may also use methods of the network saving mode session logic requesting priority handling of streaming media traffic from the network (e.g. Quality of Service requests).

Once in expedited delivery mode, the systems and methods may resume network savings mode when triggered (e.g., by the buffer fill level increasing to a calculated upper threshold or fill level increasing faster than a threshold positive rate). In some embodiments, if expedited delivery mode is entered after network savings mode after a stall, then the session remains locked in expedited delivery mode for the remainder of the streaming media session in order to lower the risk of a second stall.

In some embodiments, expedited delivery mode slows to or near the playback consumption rate once a maximum buffer fill threshold is reached in order to avoid getting too far ahead of the playback position in the streaming presentation.

In the following detailed description, reference is made to the accompanying drawings, which form a part of the description. The embodiments described in the detailed description, drawings, and claims are not meant to be limiting. Other embodiments may be utilized, and other changes may be made, without departing from the spirit or scope of the subject matter presented herein. It will be understood that the aspects of the present disclosure, as generally described herein and illustrated in the drawings, may be arranged, substituted, combined, separated, and designed in a wide variety of different configurations.

The technology can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term processor refers to one or more devices, circuits, and/or processing cores configured to process data, such as computer program instructions.

A detailed description of embodiments is provided below along with accompanying figures that illustrate the principles of the technology. The technology is described in connection with such embodiments, but the technology should not be limited to any embodiment. The scope of the technology is limited only by the claims and the technology encompasses numerous alternatives, modifications and equivalents. Numerous specific details are set forth in the following description in order to provide a thorough understanding of the technology. These details are provided for the purpose of illustration and the technology may be practiced according to the claims without some or all of these specific details. For the purpose of clarity, technical material that is known in the technical fields related to the technology has not been described in detail so that the technology is not unnecessarily obscured.

FIG. 1 illustrates an exemplary network 100 for conditional downloading of data (e.g., media content data) to a receiving system 10* using idle network capacity. The network environment 100, as illustrated, includes a receiving system 10*, one or more content servers 30a-c, and a delivery manager 34 (which may be a server or a workstation) that communicate with one another over a data communication network 20 (hereinafter "network 20"). Although only one is illustrated, a plurality of receiving systems 10* may be connected to the network 20 at any given time. Note that for purposes of the following, "*" represents a wildcard. Thus, references in the following to, for example, a receiving system 10* may be in reference to the receiving system 10' of FIG. 2A or to the receiving system 10" of FIG. 2B, which are two different implementations of the receiving system 10* of FIG. 1.

Any of the machines, databases, or devices shown in FIG. 1 may be implemented in a general-purpose computer modified (e.g., configured or programmed) by software to be a special-purpose computer to perform the functions described herein for that machine, database, or device. Moreover, any two or more of the machines, databases, or devices illustrated in FIG. 1 may be combined into a single machine, and the functions described herein for any single machine, database, or device may be subdivided among multiple machines, databases, or devices. For example, the delivery manager 34 and the content servers 30a-c may be combined as a single server (e.g., one content server that provides the functionality of delivering content and monitoring and applying pre-delivery policy conditions).

The content servers 30a-c may provide a variety of different media and other content types, such as video content (e.g., movies, television shows, recorded sporting events, news programming, video clips), image content (e.g., image or picture slideshows), audio content (e.g., radio programming, music, podcasts), and so forth. The content servers 30a-c may deliver, transfer, transport, and/or otherwise provide media files and other content to requesting devices (e.g., receiving system 10*) via various media transfer protocols (e.g., Hypertext Transfer Protocol (HTTP), File Transfer Protocol (FTP), HTTP Live Streaming (HLS), HTTP Dynamic Streaming (HDS), HTTP Smooth Streaming (HSS), Dynamic Adaptive Streaming over HTTP (DASH), Real Time Streaming Protocol (RTSP), and so on).

The network 20 may be any network that enables communication between or among machines, databases, and devices. Accordingly, the network 20 may be a wide access network (WAN), wired network, a fiber network, a wireless network (e.g., a mobile or cellular network), a cellular or telecommunications network (e.g., WiFi, Global System for Mobile Communications (GSM), Universal Mobile Telecommunications System (UMTS), Long Term Evolution (LTE) network), or any suitable combination thereof. The network 20 may include one or more portions of a private network, a public network (e.g., the Internet), or any suitable combination thereof.

The receiving system 10* may include various types of user devices, such as mobile devices (e.g., laptops, smart phones, tablet computers, and so on), desktop computers, workstations, set-top boxes, vehicle computing devices, gaming devices, and so on. The receiving system 10* may support and run various different operating systems, such as Microsoft® Windows®, Mac OS®, iOS®, Google® Chrome®, Linux®, Unix®, or any other mobile operating system, including Symbian®, Palm®, Windows Mobile®, Google® Android®, Mobile Linux®, and so on. As will be further described herein, the receiving system 10* may also support various components configured to request, receive, display, and/or present content to users associated with the receiving system 10*. Further, the receiving system 10* may further support components to configured to monitor the fill level of a buffer.

In various embodiments, the receiving system 10* may be designed to communicate with the delivery manager 34 and/or one or more of the content servers 30a-c in order to download a copy of a media file (e.g., a movie, an episode of a TV show, a music recording, and so forth). Typically large data files, such as a media file, will need to be streamed to a receiving system 10* from, for example, a content server 30a by breaking the media file in small segments. As each of the segments are being transmitted to the receiving system 10* from the content server 30a via the network 20, the receiving system 10* (or the client application residing at the receiving system 10* such as a media player application) will communicate with the content server 30a (or the delivery manager 34, which may control the streaming operations of the content server 30a) to facilitate the downloading of the media file. For example, suppose the user 5 associated with the receiving system 10* selects a particular media file (e.g., a movie) to be downloaded from the content server 30a. The receiving system 10* (via client application) may send a request for the requested media file to the delivery manager 345 or to the content server 30a. After receiving the request, the delivery manager 345 or the content server 30a may transmit to the receiving system 10* the first segment (for purposes of this example, assume that the requested media file may be broken into 20 segments or portions). of the requested media file. Upon receiving the first segment. The receiving system 10* may be required to, under some streaming protocols, to send back to the delivery manager 34 (or to the content server 30a) an acknowledgement message that indicates that the first segment was successfully received. Before the next segment is transmitted by the content server 30a (or by the delivery manager 34), in some cases, the receiving system 10* may need to transmit to the delivery manager 34 (or the content server 30a) a request message that requests for the next segment. Alternatively, the acknowledgement message sent by the receiving system 10* may indicate to the delivery manager 34 (or the content server 30a) that the receiving system 10* is ready to receive the next segment. This procedure may be repeated over and over again for each segment to be transmitted to the receiving system 10*. Thus, even though the receiving system 10* is only receiving a requested media content, the receiving system 10* (or a client application) may actually control when and how a media file is to be transmitted to the receiving system 10* via its communications with the delivery manager 34 or with the content server 30a.

Figure 2A:
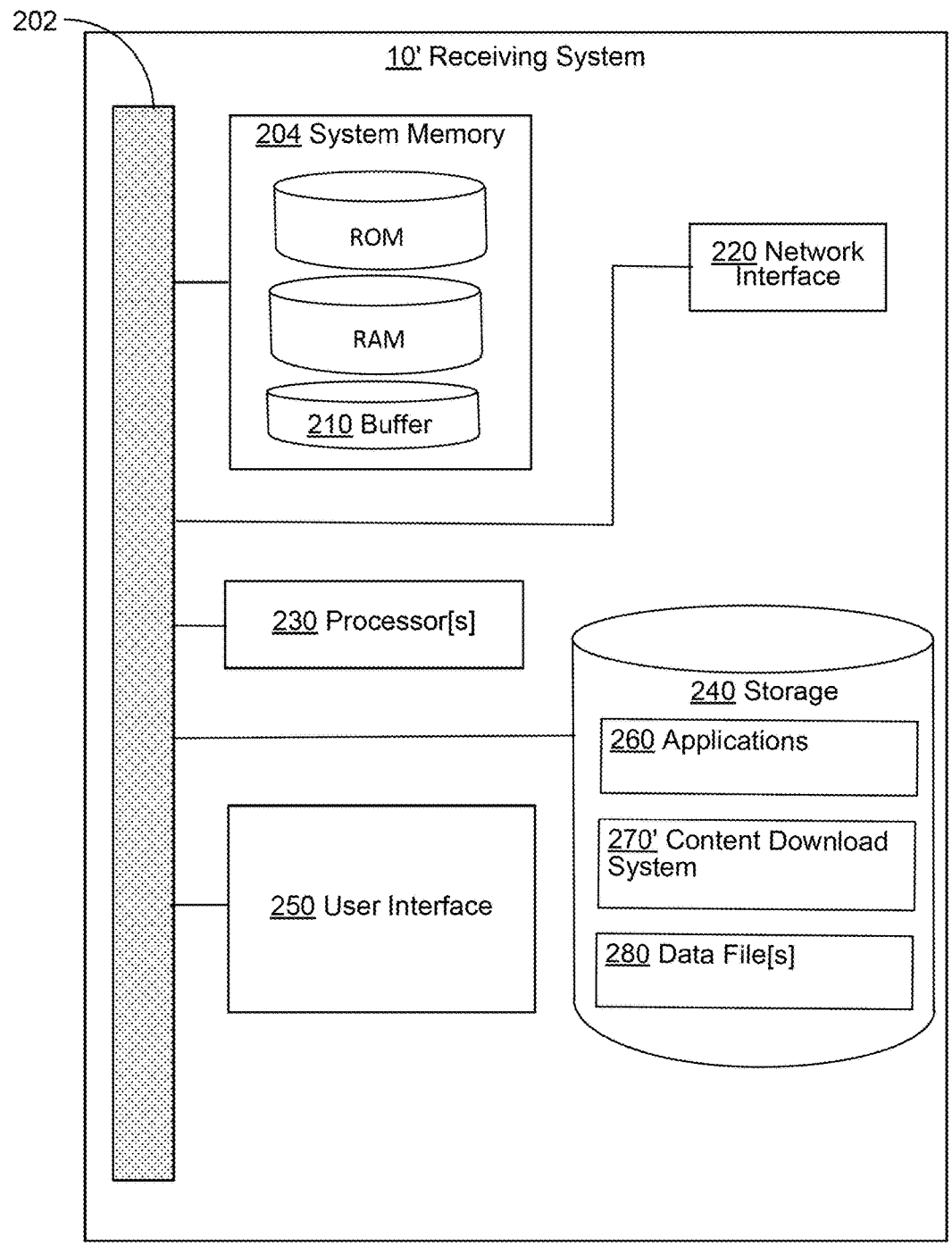
FIG. 2A is a block diagram illustrating a particular embodiment of a receiving system.
Figure 2B:
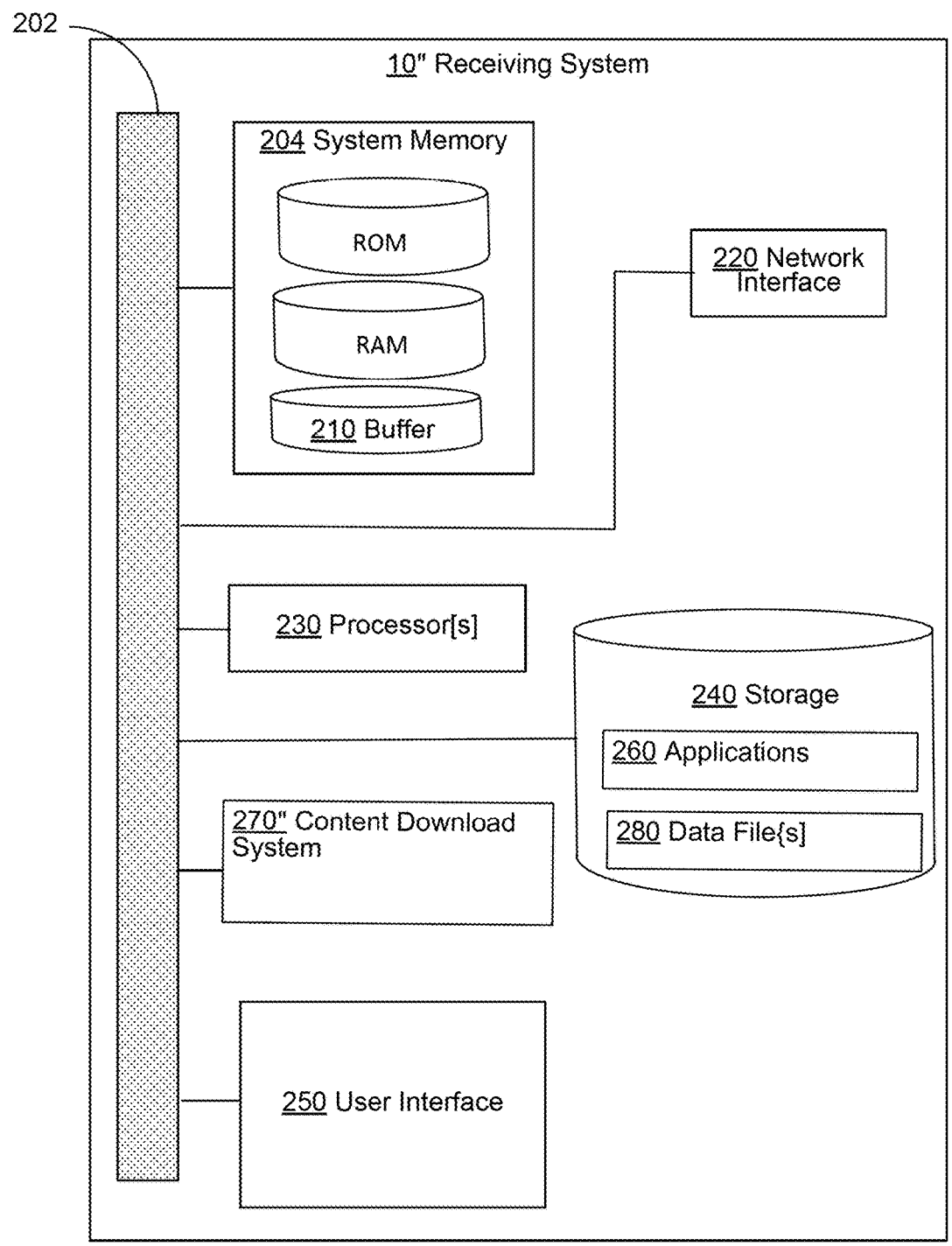
FIG. 2B is a block diagram illustrating another embodiment of a receiving system.

Turning to FIGS. 2A and 2b, which illustrates two different implementations of the receiving system 10* of FIG. 1 illustrated as receiving system 10' in FIG. 2A and as receiving system 10" in FIG. 2B. Referring particularly now to the receiving system 10' of FIG. 2A. The receiving system 10' may include a system memory 204 (which may comprise of read only memory and/or random access memory) including a portion set aside for a buffer 210, a network interface 220 (e.g., a network interface card or NIC, a transceiver, and so forth), one or more processors 230, user interface 250 (e.g., display monitor[s], speaker[s], microphone[s], keyboard, and so forth) and a storage 240 (e.g., volatile and/or non-volatile memory). As further illustrated, the storage 240 may store one or more applications 260 (e.g., media player, gaming applications, productivity applications, and so forth), a content download system 270', and one or more data files 280 (e.g., media files, word processing documents, image files, etc.) The content download system 270' stored in the storage 240 may be in the form of machine readable instructions that can be implemented using programmable circuitry such as the one or more processors 230.

Referring now to the receiving system 10" of FIG. 2B. The receiving system 10" includes essentially the same components (e.g., system memory 204, buffer 210, network interface 220, processor[s] 230, and forth) as the receiving system 10' of FIG. 2A except that in receiving system 10" the content download system 270" is implemented using specifically designed circuitry (e.g., application specific integrated circuit or ASIC). In contrast, the corresponding content download system 270' in FIG. 2A is implemented using software that may be executed using one or more processors 230.

In various embodiments, the content download system 270* (e.g., the content download system 270' of FIG. 2A or the content download system 270") may be designed to, among other things, download from a network 20 and into the buffer 210 a first portion of media content (e.g., digital copy of a movie) in accordance with a first content streaming mode, the first content streaming mode permitting downloading of media content data even when there is no idle network capacity, and upon determining that the buffer 210 has been filled to a threshold level, download from the network 20 and into the buffer 210 a second portion of the media content in accordance with a second content streaming mode, the second content streaming mode permitting downloading of media content data only when the network 20 is determined to have idle network capacity. More details related to the content download system 270* will be provided below with respect to the processes and operations to be described herein.

Turning now to FIG. 2C, which illustrates some of the components that may be included in the content download system 270* of FIG. 2A or FIG. 2B. As illustrated, the content download system 270* may include a content request transmission component 272, a buffer fill level determination component 274, a buffer size control component 276, a network idle capacity determination component 278, and/or a triggering event detection component 280. The various "components" illustrated here may be implemented using software (that is executed using, for example, one or more processors 230) or using specially designed circuitry (e.g., ASIC). For example, if the content download system 270* is the content download system 270' of FIG. 2A, then the various components may be implemented with software (e.g., computer readable instructions). Alternatively, if the content download system 270* is the content download system 270" of FIG. 2B, then the various components may be implemented with circuitry (e.g., ASIC).

In brief, the content request transmission component 272 may be designed to, among other things, transmit requests to, for example, a content server 30* or a delivery manager 34 that request at least one or more portions of a data file (e.g., media file) to be transmitted to the receiving system 10*. In some implementations, the requests that are transmitted may identify the conditions (e.g., time, speed, idle network capacity, and so forth) that the one or more portions of the data file should be transmitted. In this implementation, the content server 30* or the delivery manager 34 may have the logic to determine, for example, when there is idle network capacity, and to send the requested data only when there is, indeed, idle network capacity when the receiving system 10* is operating in network savings mode.

The buffer fill level determination component 274 may be designed to monitor the fill level of the buffer 210 and to determine whether the buffer 210 has been filled to various buffer threshold levels. The buffer size control component 276, in contrast, may be designed to control the size of the buffer. Thus, for example, if the receiving system 10* is operating in a network savings mode, the size of the buffer 210 may be increased in some implementations.

The network idle capacity determination component 278 may be designed to determine whether a network 20 has idle network capacity. Various approaches may be used in order to make such determination. For example, one way to make such a determination may be to simply query a network provider which has such information. Another way for making such a determination is to transmit test data packet into the network 20 and measure certain parameters. Specific details as to how idle network capacity can be determined may be found, for example, in commonly-assigned U.S. Pat. No. 7,500,010, issued on Mar. 3, 2009, entitled ADAPTIVE FILE DELIVERY SYSTEM AND METHOD, U.S. Pat. No. 8,589,585, issued on Nov. 19, 2013, entitled ADAPTIVE FILE DELIVERY SYSTEM AND METHOD, U.S. Published Patent Application No. 2010/0198943, filed on Apr. 15, 2010, entitled SYSTEM AND METHOD FOR PROGRESSIVE DOWNLOAD USING SURPLUS NETWORK CAPACITY, and U.S. Published Patent Application No. 2013/0124679, filed on Jan. 3, 2013, entitled SYSTEM AND METHOD FOR PROGRESSIVE DOWNLOAD WITH MINIMAL PLAY LATENCY, all of which are hereby incorporated by reference in their entirety.

The triggering event detection component 280 may be designed to, among other things, detect occurrence of one or more triggering events that when detected, may cause for example, the receiving system 10* to operate in an expedited delivery mode. Examples of triggering event may be (1) the buffer fill level (after the receiving system 10* has gone into a network saving mode) dips below a particular threshold level (e.g., the threshold level in which consumption of media content begins, the threshold in which the network savings mode is implemented, or when the buffer fill level has fallen to zero or near zero so playback is stalled) or (2) when the buffer fill level decreases at a rate that falls below a minimum allowable fall rate. A more detailed discussion related to the various components of the content download system 270* will be provided below with respect to the operations and processes to be discussed herein.

Figure 3A:
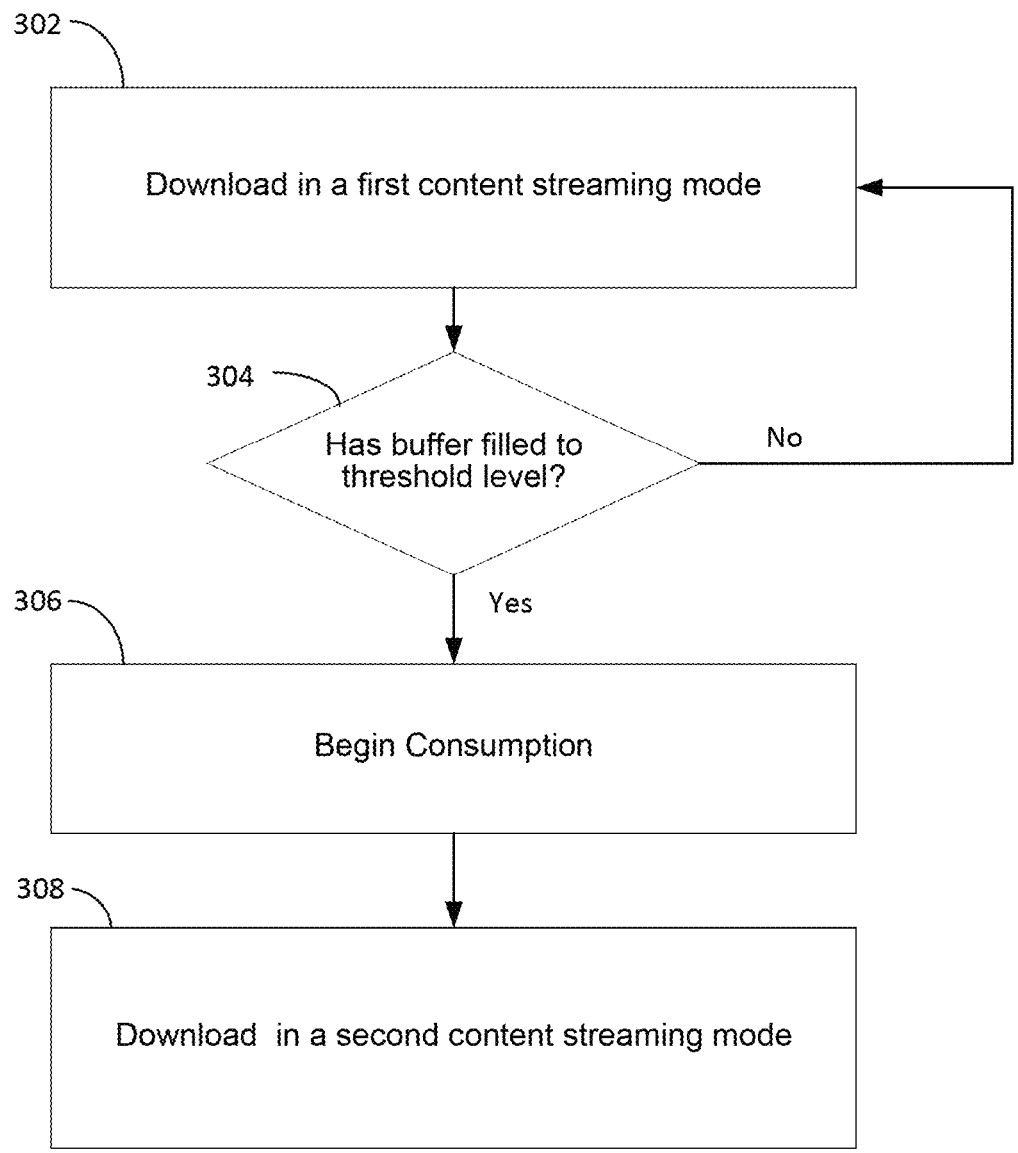
FIG. 3A is a high-level logic flow diagram of a process according to an embodiment.

FIG. 3A illustrates a process 300 for downloading media content by conditionally using idle network capacity in accordance with some embodiments. In FIG. 3A and in the following figures that include various examples of operational flows, discussions and explanations will be provided with respect to the receiving system 10* described above and as illustrated in FIGS. 1, 2A, 2B, and 2C, and/or with respect to other examples (e.g., as provided in FIGS. 5A, 5B, 5C, 5D, 5E, 5F, 5G, 5H, 5J, and 5J) and contexts. However, it should be understood that the operational flows may be executed in a number of other environments and contexts, and/or in modified versions of FIGS. 1, 2A, 2B, 2C, 5A, 5B, 5C, 5D, 5E, 5F, 5G, 5H, 5J, and/or 5J. Also, although the various operational flows are presented in the sequence(s) illustrated, it should be understood that the various operations may be performed in orders other than those which are illustrated, or may be performed concurrently.

The process 300 begins at operation 302 when, for example, a first portion of media content is downloaded into a buffer 210 in accordance with a first content streaming mode (e.g., a conventional streaming (CS) mode) that does not require idle network capacity. For example, the content download system 270* of the receiving system 10* downloading from a network 20 and into a buffer 210 a first portion of media content (e.g., digital copy of a movie) in accordance with a first content streaming mode, the first content streaming mode permitting downloading of media content data even when there is no idle network capacity (e.g., no available bandwidth or available network resources). In some cases, a CS mode may actually include two sub delivery modes, a first sub delivery mode that calls for filling the buffer 210 as quickly as possible, and then transitions to a second sub delivery mode that calls for a metered rate of delivery that requires the media content to be delivered/downloaded at the same rate as the playback/consumption rate of the media content. Note that in either the first sub delivery mode or the second sub delivery mode, there is no requirement for idle network capacity to exist in order to deliver/download the media content. As a result, operating in both sub delivery modes may contribute to network congestion.

At decision 304, a determination is made as to whether the buffer 210 has been filled to a threshold level. If it is determined that the buffer 210 has not been filled to the threshold level, then the process 300 returns to operation 302 and the downloading of the first portion of the media content into the buffer 210 resumes using the first content streaming mode. On the other hand, if the buffer 210 has been determined to have been filled to the threshold level, then the process moves to operation 306. For example, the buffer fill level determination component 274 (see FIG. 2C) determining that the buffer has been filled to a threshold level. In operation 306 the consumption of the first portion of the media content already downloaded to the buffer 210 begins. For example, the content download system 270* permits the already downloaded data in the buffer 210 to be consumed by (or released to) the user interface 250 (e.g., display and speaker[s]) via, in some cases, an independent media player.

In operation 308, a second portion of the media content is downloaded into the buffer 210 in accordance with a second content streaming mode (e.g., network savings mode) upon verifying that the buffer 210 has indeed been filled to the threshold level. For example, the content download system 270* downloading from the network 20 and into the buffer 210 a second portion of the media content in accordance with a second content streaming mode (e.g., network savings mode) and in response to determining that the buffer 210 has been filled to the threshold level, the second content streaming mode permitting downloading of media content data only when there is idle network capacity.

Figure 3B:
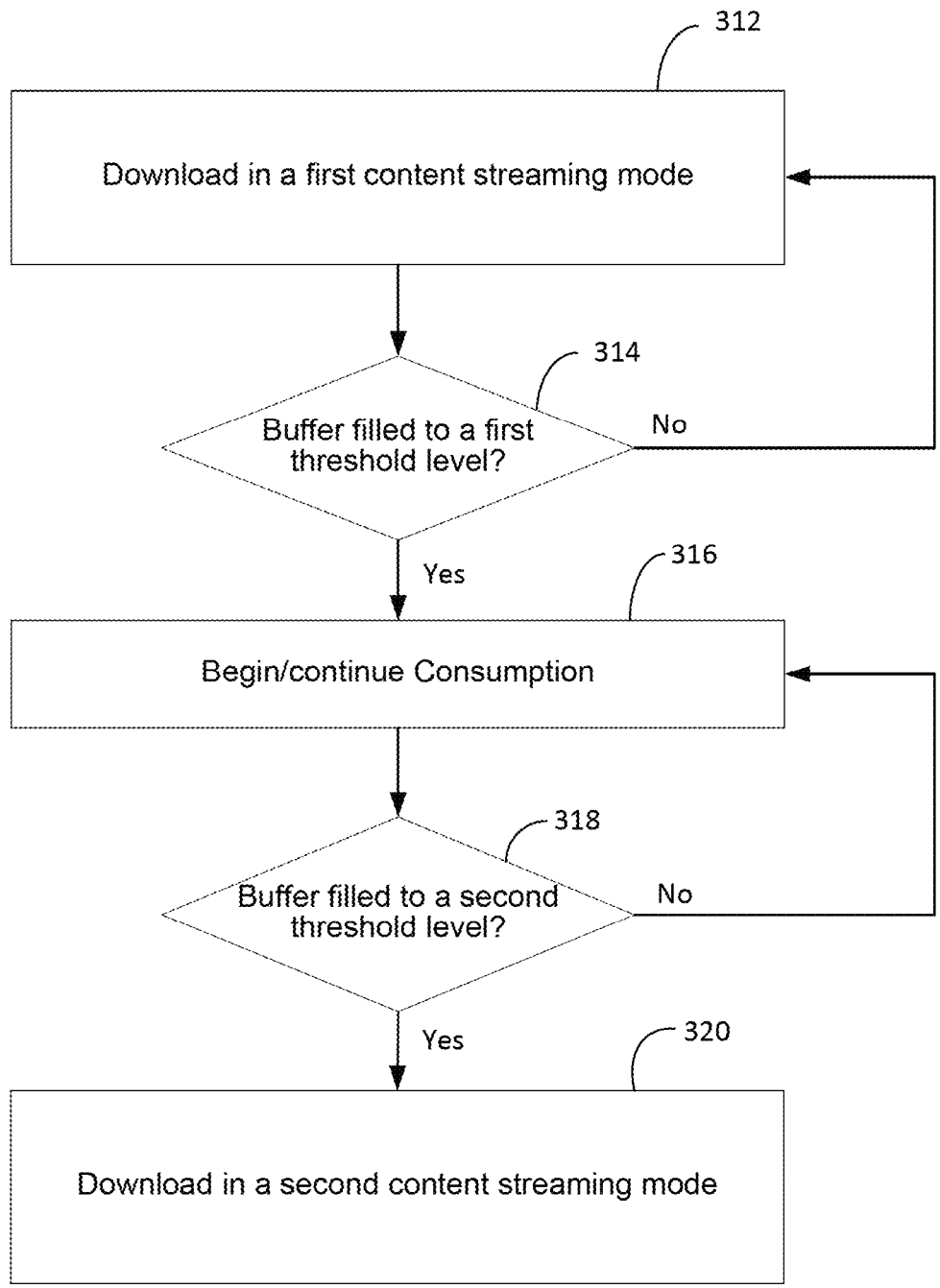
FIG. 3B is a high-level logic flow diagram of a process according to an embodiment.

FIG. 3B, illustrates a process 310 for downloading media content by conditionally using idle network capacity according to another embodiment. Process 310 includes some of the same operations included in operation 300 of FIG. 3A. That is, operations 312, 316, and 320 mirror operations 302, 306, and 308, respectively of FIG. 3A. The relevant difference between process 300 of FIG. 3A and process 310 of FIG. 3B is that in process 300 there is only a single determination made at decision 304 as to whether the buffer has been filled to a threshold level. If the determination is made that in fact the a threshold level has been reached, then both the consumption of the media content data already stored in the buffer 210 and the downloading of the second portion of the media content in accordance with the second streaming mode (e.g., network saving mode) begins.

In contrast, in process 310 two separate determinations are made as to whether the buffer fill level has reached a first threshold level in decision 314 and whether the buffer fill level has reached a second threshold level in decision 318. Both of these decisions may be made by the buffer fill level determination component 274 of FIG. 2C. If in decision 314, a determination is made, for example, by the buffer fill level determination component 274 that the buffer fill level has reached the first threshold level, then process 310 moves to operation 316 where consumption of the media content already stored in the buffer 210 is allowed to begin. In contrast, if in decision 318, a determination is made that the buffer fill level has reached the second predefined threshold level, then process 310 moves to operation where downloading of the second portion of the media content begins in accordance with the second content streaming mode (e.g., network savings mode).

Figure 3C:
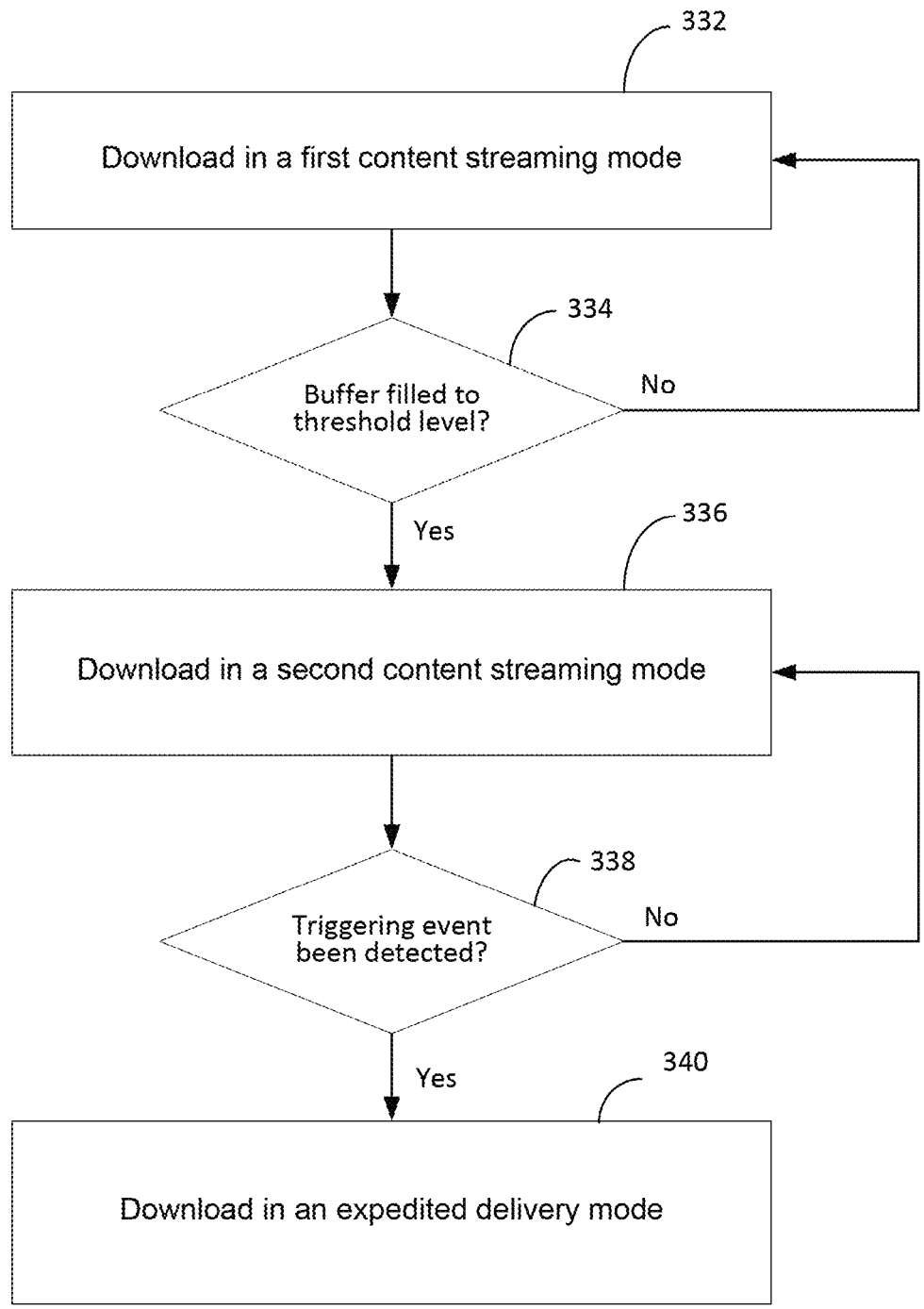
FIG. 3C is a high-level logic flow diagram of a process according to an embodiment.

FIG. 3C a process 330 for downloading media content by conditionally using idle network capacity according to yet another embodiment. Process 330 includes some of the same operations and decision included in operation 300 of FIG. 3A. That is, operations 332 and 336 and decision 334 mirror operations 302 and 308 and decision 304, respectively, of FIG. 3A. In addition, process 330 includes decision 338 for determining whether a triggering event (e.g., the buffer fill level has fallen below a certain minimal predefined level) has occurred. If a determination is made that no triggering event has occurred the process 330 returns to operation 336 where the second portion of the media content continues to be downloaded into the buffer 210 in accordance with the second content streaming mode (e.g., network savings mode). For example, the triggering event detection component 278 of the content download system 270* making a determination that a triggering event has, in fact, occurred. And if such a determination is made, then process 330 moves to operation 340 in which a third portion of the media content is downloaded to the buffer 210 in accordance with an expedited delivery mode (e.g., CS mode or some other type of expedited delivery mode). For example, the content download system 270* transmitting to the content server 30* or to the delivery manager 34 to stream the third portion of the media content in accordance with an expedited delivery mode.

Figure 4A:
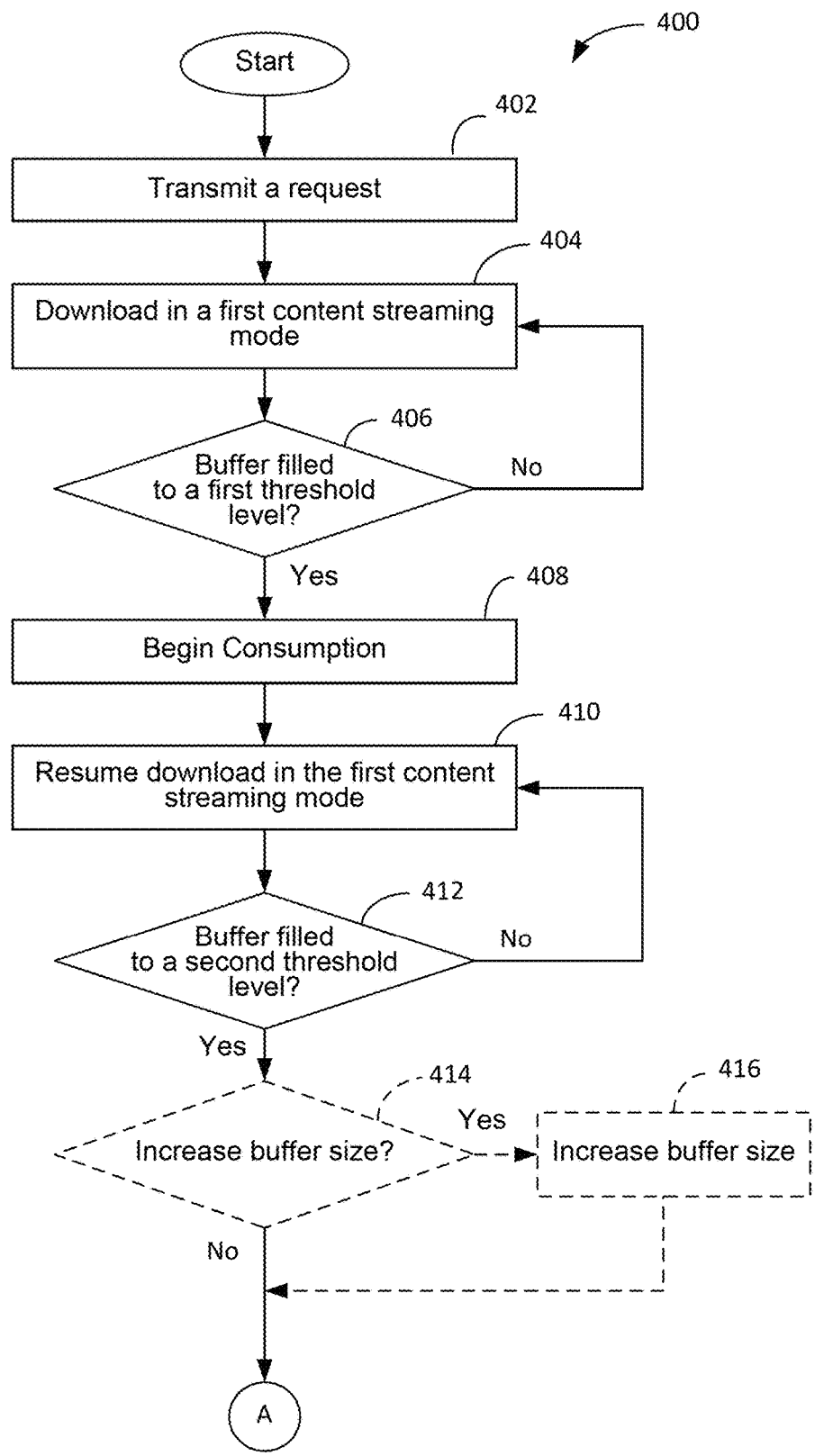
FIGS. 4A, 4B, and 4C illustrate a flow diagram of a process according to an embodiment.
Figure 4B:
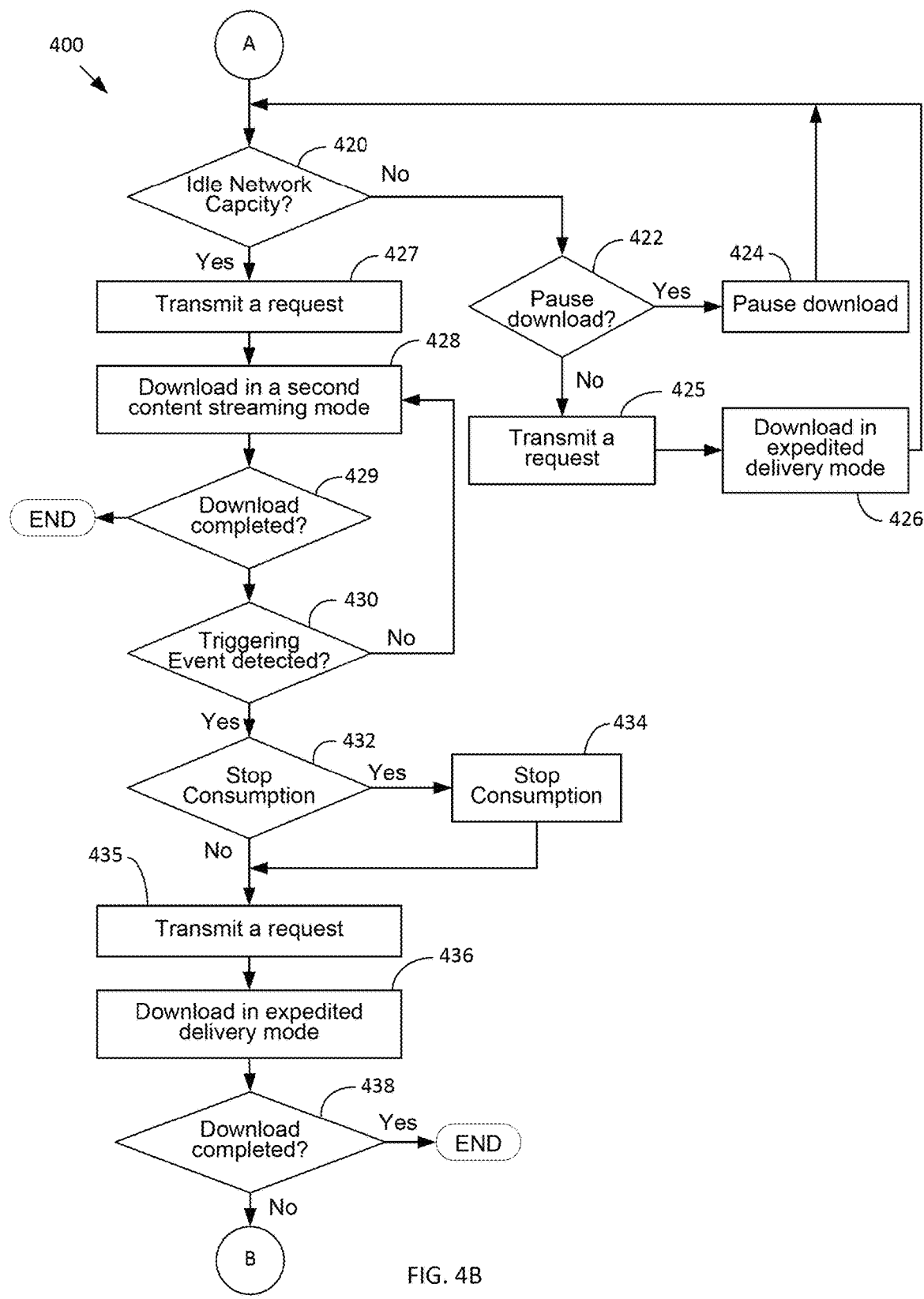
Figure 4C:
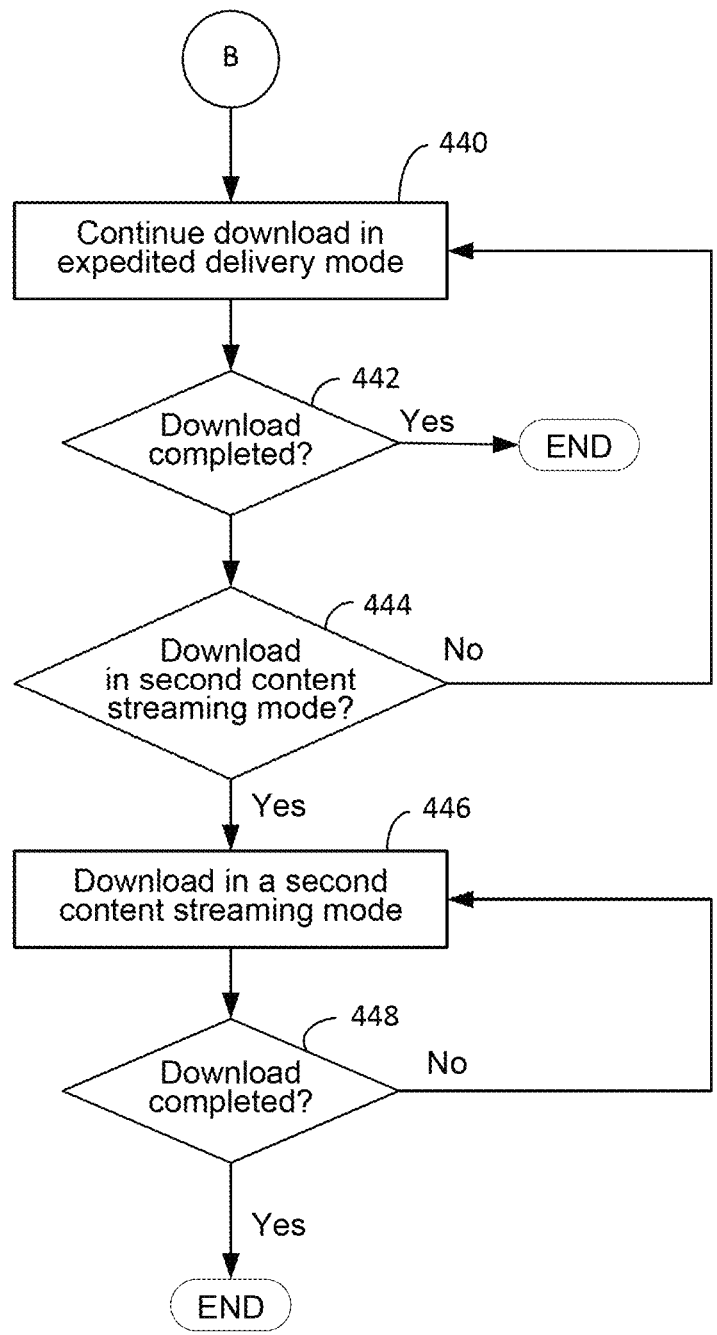

FIGS. 4A, 4B, and 4C illustrates a process 400 for downloading multiple portions of a media content file by conditionally using idle network capacity according to an embodiment. For ease of illustration and explanation, the process 400 in the following will be described herein as being performed by the receiving system 10* of FIGS. 1, 2A, and/or 2B. However, those of ordinary skill in the relevant art will recognize that process 400 may be implemented by other systems and devices. The process 400 may begin in operation 402 when, for example, the content request transmission component 272 transmits a request (e.g., transmits to a content server 30* or to a delivery manager 34) that requests at least a first portion of a media content file be streamed to the receiving system 10*. In operation 404, the content download system 270* downloads into the buffer 210 the first portion of the content media file in accordance with a first content streaming mode (e.g., conventional streaming or "CS" mode). At decision 406, the buffer fill level determination component 274 determines whether the buffer 210 has been filled to a first threshold level. If it is determined that the buffer 210 has not been filled to the first threshold level, the process returns to operation 404. On the other hand, if it is determined that the buffer 210 has been filled to at least the first threshold level, then the process 400 moves to operation 408 where consumption of media content data already stored in the buffer 210 begins (in some embodiments, the content download system 270* may permit the consumption of media content data stored in the buffer 210.) In operation 410, the first portion of the media content file continues to be downloaded into the buffer 210 in accordance with the first content streaming mode.

In decision 412, the buffer fill level determination component 274 determines whether the buffer 210 has been filled to a second threshold level. If it is determined that the buffer 210 has not been filled to the second threshold level, then the process 412 returns to operation 410. On the other hand, if it is determined that the buffer 210 has, in fact, been filled to at least the second threshold level, then process 400 moves to decision 414 where a determination is made as to whether the size of the buffer 414 should be increased (e.g., a determination made by the content download system 270*). If the size of the buffer 210 is to be increased, then process 400 moves to operation 416 where the size of the buffer 210 is increased. In some embodiments, the size of the buffer 210 may be increased statically (e.g., only once or at predefined set points), while in other embodiments, the size of the buffer 210 may be dynamically increased (e.g., increased as needed). Decision 414 and operation 416 are optional operations in various embodiments.

Next, process 400 moves to decision 420 where, for example, the network idle capacity determination component 276 determines whether there is idle network capacity. If it is determined that there is no idle network capacity, then process 400 moves to decision 422 where a determination is made (e.g., by the content download system 270*) as to whether the downloading of the media content data should be stopped or paused. If a determination is made that the downloading should be stopped, then process 400 moves to operation 424 where the downloading is stopped/paused. On the other hand, if at decision 422 a determination is made that the downloading should not be stopped, then process 400 may move to operation 425 where, for example, the content request transmission component 272 transmits to, for example, the content server 30* or the delivery manager 34, a request to begin streaming the next portion of the media content file. In some embodiments, the request to be transmitted may request that the next portion of the media content file to be streamed should be streamed in accordance with an expedited delivery mode. Next, at operation 426, the content download system 270* may download into the buffer 210 the next portion of the media content file in accordance with expedited delivery mode (which may be a conventional streaming mode or some other expedited delivery mode).

Returning to decision 420, if the network idle capacity determination component 276 had determined or verified that there was in fact idle network capacity, then process 400 moves to operation 427 where, for example, the content request transmission component 272 transmits to the content server 30* or to the delivery manager 34 a request to transmit the next portion of the media content file to the receiving system 10*. In some embodiments, the request that is transmitted may specifically request that the next portion of the media content file to be transmitted be transmitted in accordance with a second content streaming mode (e.g., network savings mode). Next, in operation 428 the next portion of the media content file is downloaded by the content download system 270* into the buffer 210.

Process 400 next moves to decision 429 where a determination made, for example, by the content download system 270* as to whether the downloading of the media content file has been completed. If it is determined that the downloading has been completed, then the process 400 ends. If the downloading of the media content file is determined not to have been completed, then the process 400 moves to decision 430 where, for example, the triggering event detection component 278 determines whether a triggering event has occurred. If no such triggering event has been detected, then process 400 returns to operation 428. If a triggering event has been determined to have occurred, then process 400 moves to decision 432 where a determination is made by, for example, the content download system 270* as to whether to stop the consumption of the media content data already stored in the buffer 210 (such a determination may be based on a number of factors including how fast is the buffer fill level decreasing, whether the downloading speed is keeping up with the consumption speed, and so forth). If it is determined that the consumption should be stopped, then consumption of the media content data stored in the buffer 210 is stopped (operation 434). It should be noted that although not explicitly indicated in process 400, a user 5 could preempt the process 400 at any point by, for example, abandoning the playback/consumption of the media content. Alternatively the user 5 could hit "pause" and then the streaming/downloading would continue until the next threshold (e.g., the fill level has reached the maximum buffer size) has been reached or a triggering event has occurred.

Process 400 then moves to operation 435 where, for example, the content request transmission component 272 transmits to the content server 30* or the delivery manager 34 a request that the content server 30* or the delivery manager 34 start streaming the next portion of the media content file. In some embodiments, the request that is transmitted may or may not be a request that the next portion of the media content file be transmitted in accordance with an expedited delivery mode (note that if the expedited delivery mode is CS mode, then the request may or may not include any specific request for streaming in an expedited delivery mode). Next, the content download system 270* in operation 436 downloads to the buffer 210 the next portion of the media content file in accordance with the expedited delivery mode. Operation 400 then moves to decision 438 where a determination is made as to whether the downloading of the entire media content file has been completed. If it is determined that the downloading of the media content file has finished, then downloading of the media content file ends. On the other hand, if the downloading of the media content file has not yet finished, then process 400 moves to operation 440 where the next portion of the media content file continues to be downloaded into the buffer 210.

Next, process 400 moves to decision 442 where a determination made, for example, by the content download system 270* as to whether the downloading of the media content file has been completed. If it is determined that the downloading has been completed, then the process 400 ends. Otherwise, process 400 moves to decision 444 where, for example, the content download system 270* determines whether to download into the buffer 210 the next portion of the media content file in accordance with the second content media streaming mode (e.g., network savings mode). Such a determination may be based on a number of factors including, for example, whether the buffer fill level has reached the second predefined threshold level and/or other factors. If it is determined not to download the next portion of the media content file into the buffer 210 in accordance with the second content media streaming mode, then process 400 returns to operation 440.

On the other hand, if it is determined that the next portion of the media content file should be downloaded into the buffer in accordance with the second content streaming mode, then process 400 moves to operation 446 where the next portion of the media content file is downloaded into the buffer in accordance with the second content streaming mode. In some embodiments, this may be accomplished by transmitting to the content server 30* or to the delivery manager 34 a request to stream the next portion of the media content, the request being transmitted only after idle network capacity has been detected. In alternative embodiments, however, the request that is transmitted may direct the content server 30* or the delivery manager 34 to only begin streaming the next portion of the media content file only when idle network capacity has been detected by the content server 30* or the delivery manager 34.

Process 400 next moves to decision 448 where a determination made, for example, by the content download system 270* as to whether the downloading of the media content file has been completed. If it is determined that the downloading has been completed, then the process 400 ends. Otherwise, process 400 returns to operation 446.

FIGS. 5A-5J show graphs illustrating the behavior of the fill levels of a buffer over time when various content streaming modes are used under various scenarios. For ease of illustration and explanation, the following descriptions of the graphs of FIGS. 5A-5J will be referencing the receiving system 10* and its components of FIGS. 1, 2A, and/or 2B. Further, in each of the graphs, the dashed lines (ref 500) will represent the buffer fill level when the receiving system 10* is operating in accordance with the first content streaming mode (e.g., CS mode), the solid lines (ref 501) will represent the fill buffer fill levels when the receiving system 10* is operating in accordance with the second content streaming mode (e.g., network savings mode), and the dotted lines (e.g., ref **503*-503, 503a, 503b, etc.) will represent the buffer fill level when the receiving system 10*** is operating in accordance with an expedited delivery mode.

Figure 5A:
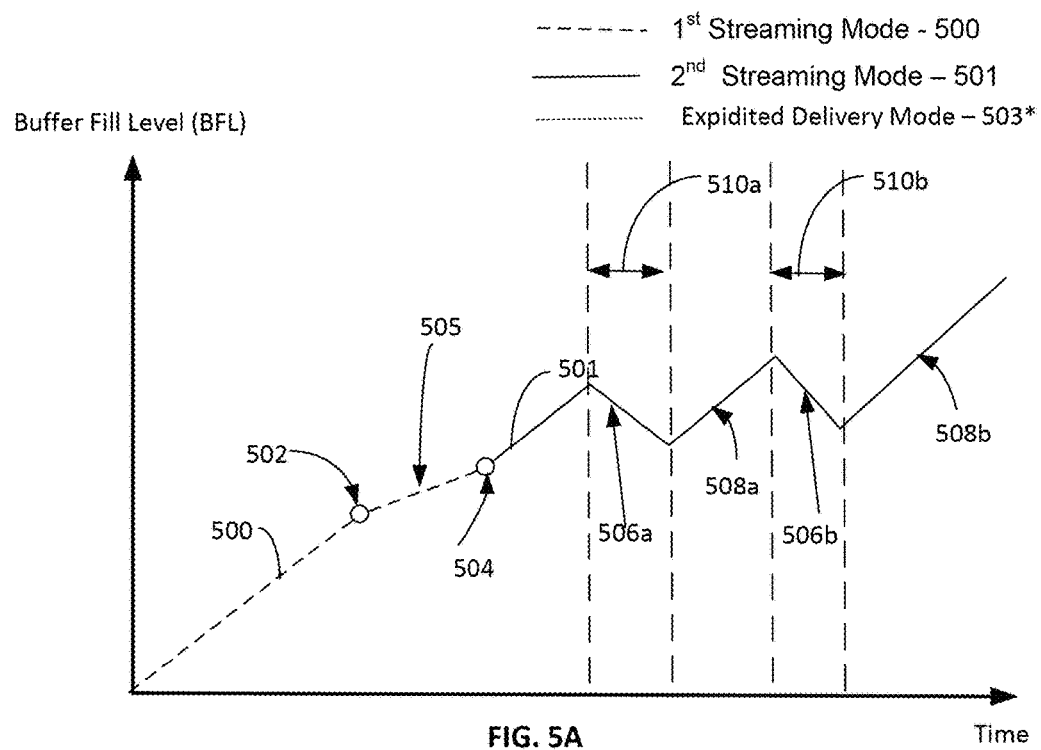
FIG. 5A is a graph illustrating exemplary buffer fill levels over time in response to certain exemplary factors.

Turning particularly now to FIG. 5A, which illustrates a graph that shows a fill level of a buffer 210 of a receiving system 10* when the receiving system 10* is operating in accordance with a first streaming mode 500 (e.g., CS mode) and when the receiving system 10* is operating in accordance with a second streaming mode 501 (e.g., network savings mode). Ref 502 represents the point at which the buffer fill level reaches a first threshold level when media content data stored in the buffer begins to be consumed (e.g., playback). As a result, the slope of the dashed line at ref 505 drops because as the buffer 210 is being filled under the first streaming mode, some of the media content data in the buffer 210 is also being consumed. At ref 504, a second threshold level is reached, and the receiving system 10* switches over to operating in accordance with the second content streaming mode. Refs. 510a and 510b represents time spans where there is network congestion. As a result, and since the receiving system 10* is already operating in the second content streaming mode (e.g., network savings mode), no media content data is being downloaded into the buffer 210. Refs. 506a and 506b show that the buffer fill levels are dropping during these periods because no media content data is being downloaded while the media content data already stored in the buffer 210 continues to be consumed. Note that once there is no network congestion, the buffer fill levels again rises as illustrated by ref 508a and 508b. In this scenario, the buffer fill level has not yet reached the maximum capacity of the buffer 210. Alternatively, the scenario depicted in FIG. 5A may represent the situation where the sized of the buffer has been increased or is being dynamically increased as needed.

Figure 5B:
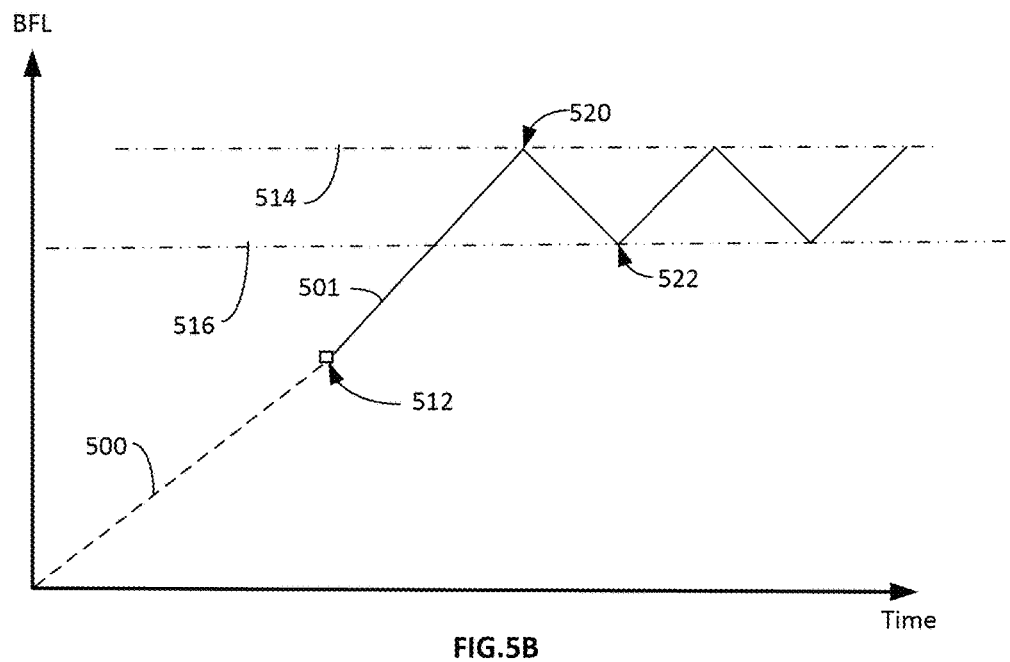
FIG. 5B is another graph illustrating exemplary buffer fill levels over time in response to certain exemplary factors.

FIG. 5B illustrates the scenario where there is only a single threshold level (where both the consumption of the stored media content data and the switch over from the first content streaming mode to the second content streaming mode occurs). In FIG. 5B, a maximum buffer level 514 (e.g., the maximum capacity of the buffer 210) and a buffer refresh level 516 is shown. In the first content streaming mode (e.g., CS mode), there may be no protocol/policy to increase the streaming rate even if there is idle network capacity. In this embodiment, once the buffer fill level reaches the maximum buffer level 514 as indicated by ref 520, the content download system 270* may be designed to pause or stop the downloading of the media content data (in some cases, the content download system 270* may transmit a request to pause streaming to the content server 30* or to the delivery manager 34). As a result, the buffer fill level drops until it reaches the buffer refresh level 516 (as indicated by ref 522) at which point the downloading of the media content data can resume (this can be accomplished by the content request transmission component 272 transmitting a request to resume streaming of the media content data). As further illustrated, the buffer fill level will continue to bounce back and forth between the maximum buffer level 514 and the buffer refresh level 516 until the media content file has been completed downloaded or the playback session is abandoned by the user.

Figure 5C:
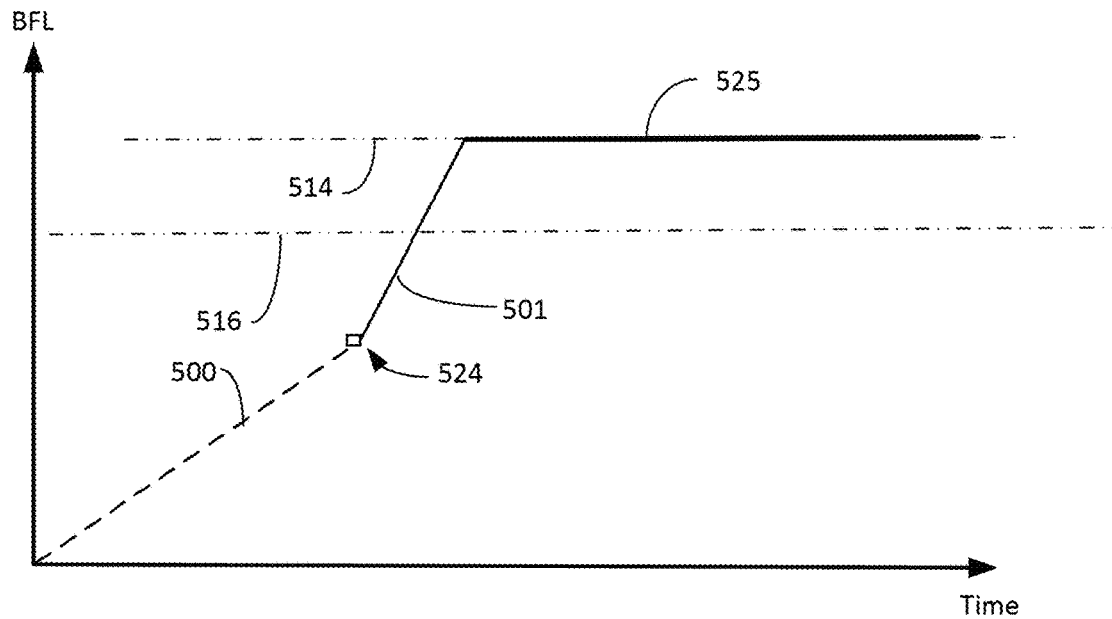
FIG. 5C is another graph illustrating exemplary buffer fill levels over time in response to certain exemplary factors.

FIG. 5C represents the scenario where the content download system 270*, upon determining that the buffer fill level has reached the maximum buffer level 514, will match the download rate of the media content data with the consumption rate of the media content data stored in the buffer 210. This may be accomplished by, for example, by switching to a streaming mode 525 that does not necessarily only use idle network capacity. That is, in order to ensure that download rate matches the consumption rate, particularly when there is no idle network capacity, the receiving system 10* may be operating in a mode that does not require idle network capacity. In some cases, the streaming mode 525 may be a CS mode, while in other cases, it may be other types of streaming mode.

Figure 5D:
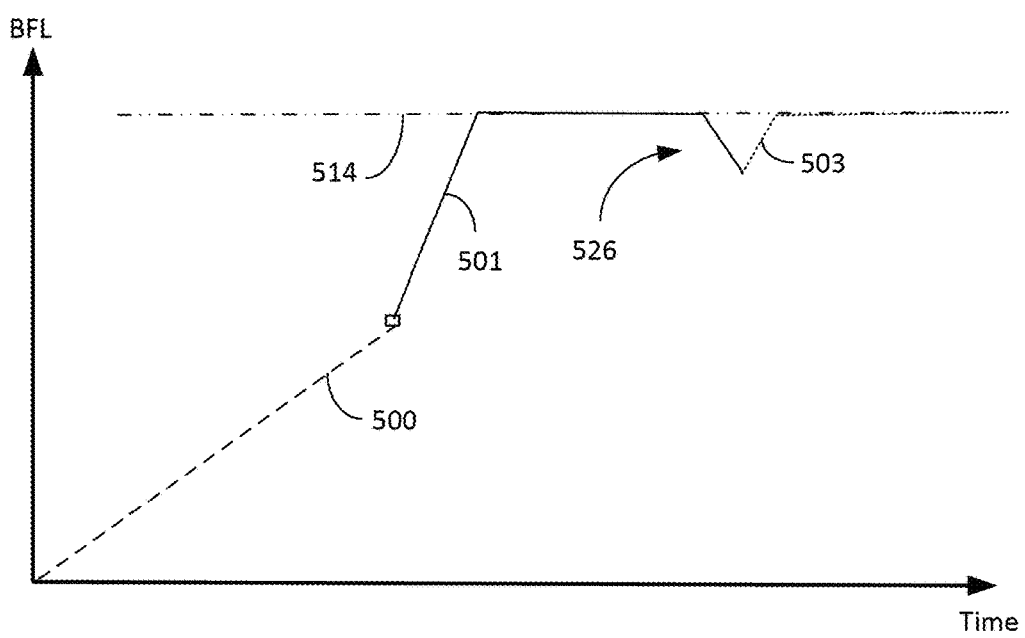
FIG. 5D is another graph illustrating exemplary buffer fill levels over time in response to certain exemplary factors.

FIG. 5D represents a similar scenario as the scenario depicted in FIG. 5C except that in the scenario illustrated in FIG. 5D, a network event (e.g., network congestion or loss of Internet services) occurs at 526 that disrupts streaming of the media content data. As a result, the receiving system 10* switches to an expedited delivery mode 503 (upon detection of a triggering event such as the disruption of the downloading of the media content data) to bring the buffer fill level back to the maximum buffer level 514.

Figure 5E:
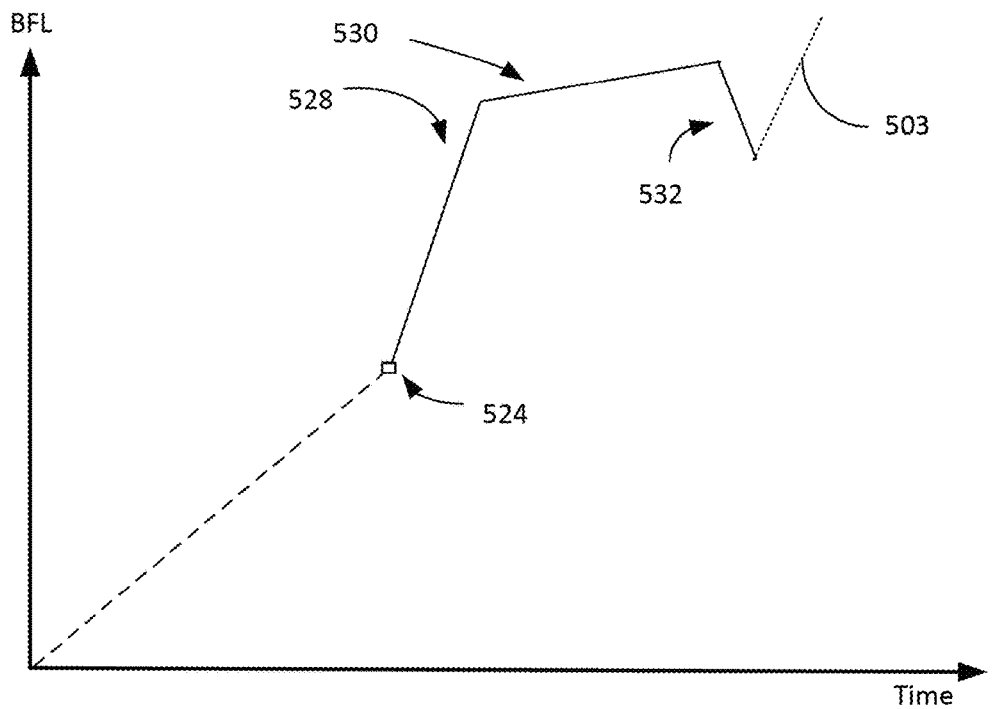
FIG. 5E is another graph illustrating exemplary buffer fill levels over time in response to certain exemplary factors.

FIG. 5E illustrates the behavior of the buffer fill level when certain network conditions arises that results in the download rate of the media content data fluctuates. Note that initially when the receiving system 10\* switches to the second content streaming mode the slope of the buffer fill line is relatively steep as indicated by ref 528 and that indicates that the buffer fill level is quickly rising. During a second phase, as indicated by ref 530, the buffer fill level does not rise as quickly because download speed of the media content file may have been reduced by some sort of network event such as reduction in the size of idle network capacity. Ref 532 represents the situation where there is no idle network capacity, and as a result, the downloading of media content data stops, and the buffer fill level drops. Eventually, the receiving system 10\* begins operating in an expedited delivery mode 503 to raise the buffer fill level.

Figure 5F:
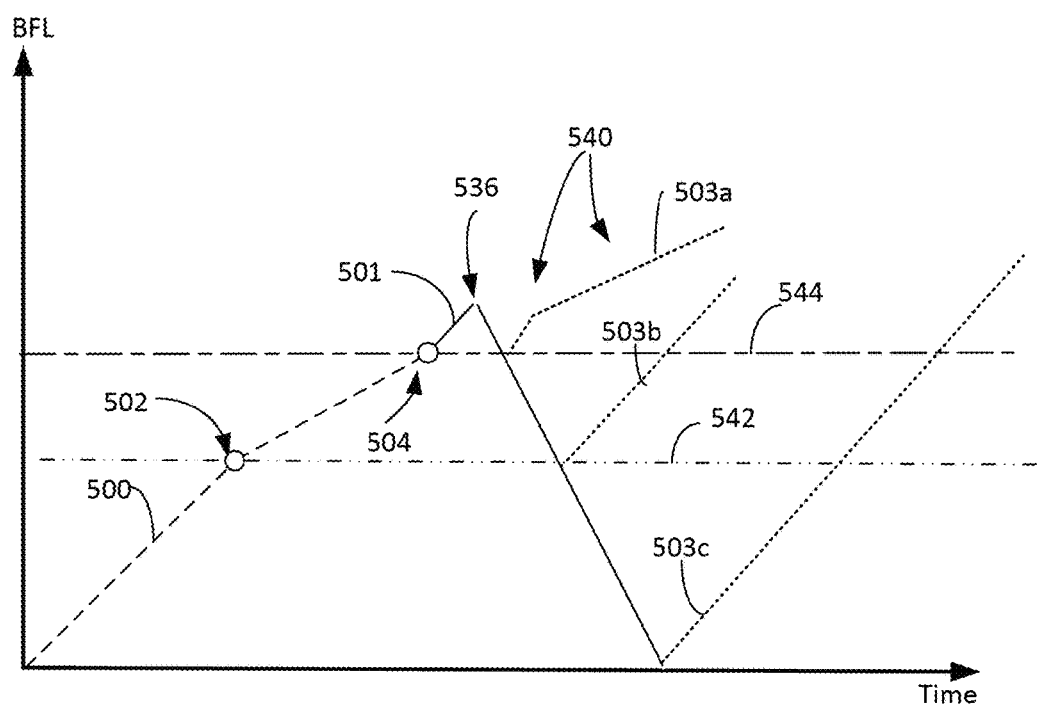
FIG. 5F is another graph illustrating exemplary buffer fill levels over time in response to certain exemplary factors.

FIG. 5F represents different scenarios when expedited delivery modes may be implemented in order to raise the buffer fill levels. In this graph, the first threshold level (e.g., the buffer threshold level when consumption begins) is represented by line 542 (which will be referred to herein as first threshold level 542) while line 544 (which will be referred to herein as second threshold level 544) represents the second threshold level (e.g., when the receiving system 10\* operates in accordance with the second streaming mode—network savings mode). Ref 536 represents the point in time when there is no idle network capacity. As a result, the buffer fill level drops as downloading of media content data stops. FIG. 5F shows three alternative buffer fill levels in which the expedited delivery mode 503\* may be implemented. For example, expedited delivery mode 503a may begin when the fill level falls to the second predefined threshold level 544. Note that for expedited delivery mode 502a, there are two slops as indicated by ref 540 because an expedited delivery 503a may be in CS mode or in some other expedited delivery mode. On the other hand, expedited delivery mode 503b starts when the buffer fill level falls to the first predefined threshold level 542. Finally, in another alternative embodiment, an expedited delivery mode 503c begins when the buffer fill level drops to zero (or near zero). Notice that in some embodiments, once the receiving system 10\* begins operating in the expedited delivery mode it may be locked into the expedited delivery mode.

Figure 5G:
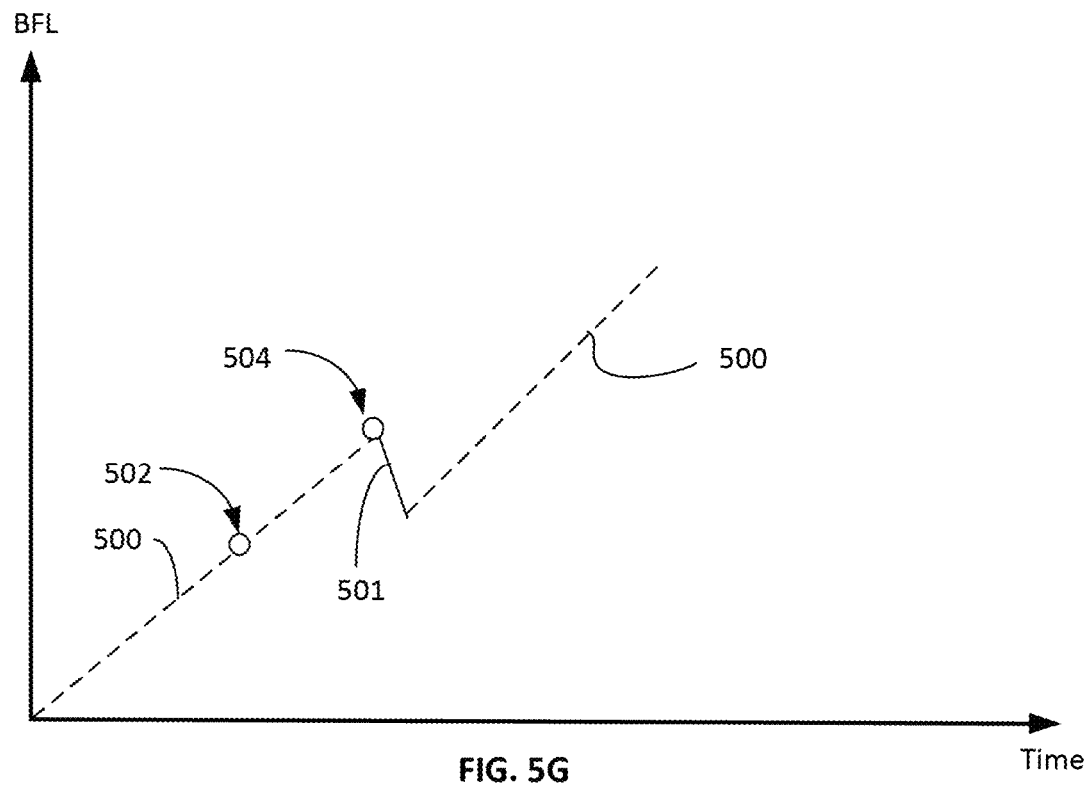
FIG. 5G is another graph illustrating exemplary buffer fill levels over time in response to certain exemplary factors.

FIG. 5G represents a scenario in which upon the receiving system 10\* switching to the second content streaming mode 501 (e.g., network savings mode) there is no idle network capacity, and as a result, the buffer fill level drops. Consequently, the receiving system 10\* quickly reverts back to the first content streaming mode 500 (e.g., CS mode)

Figure 5H:
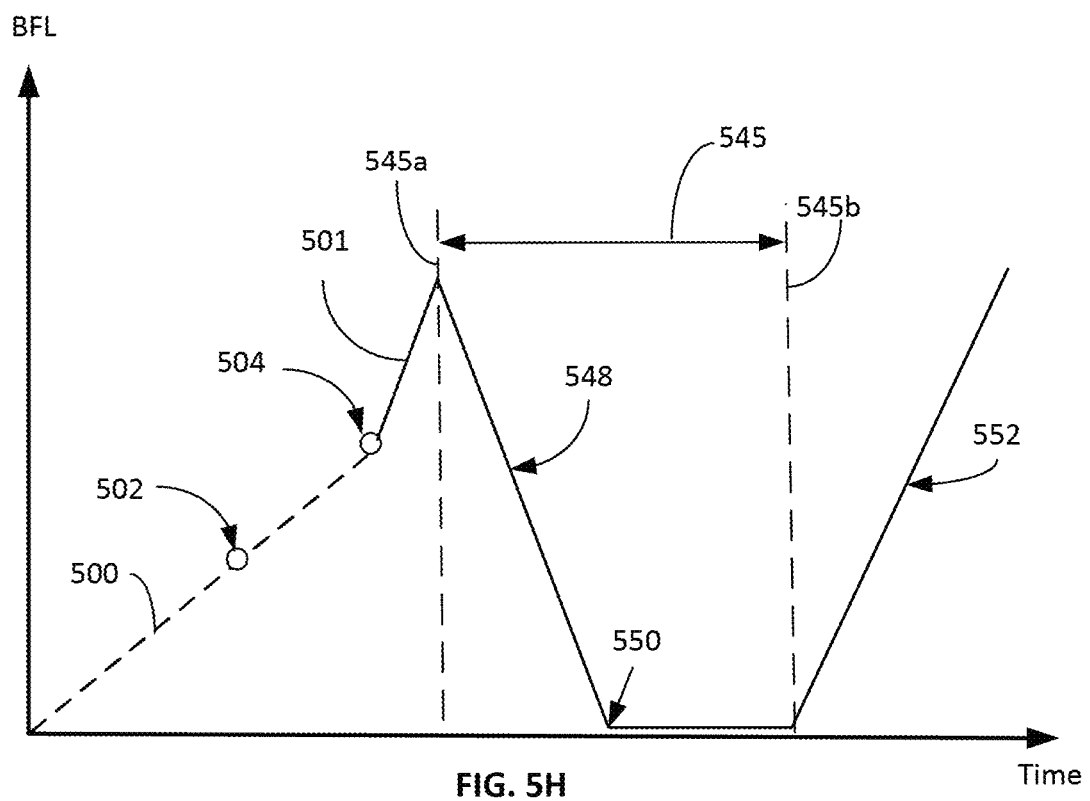
FIG. 5H is another graph illustrating exemplary buffer fill levels over time in response to certain exemplary factors.

FIG. 5H represents a scenario in which after the receiving device 10\* begins operates in accordance with the second content streaming mode 501 (e.g., network savings mode), there is a time span as indicated by ref 545 that stretches from line 545a to line 545b in which there is no idle network capacity. As a result, the buffer fill level drops (as the media content continues to be consumed) as indicated by ref 548 until the buffer fill level drops to zero or near zero as indicated by ref 550. Eventually, however, idle network capacity becomes available and the buffer fill level recovers and begins increasing as indicated by ref 552.

Figure 5I:
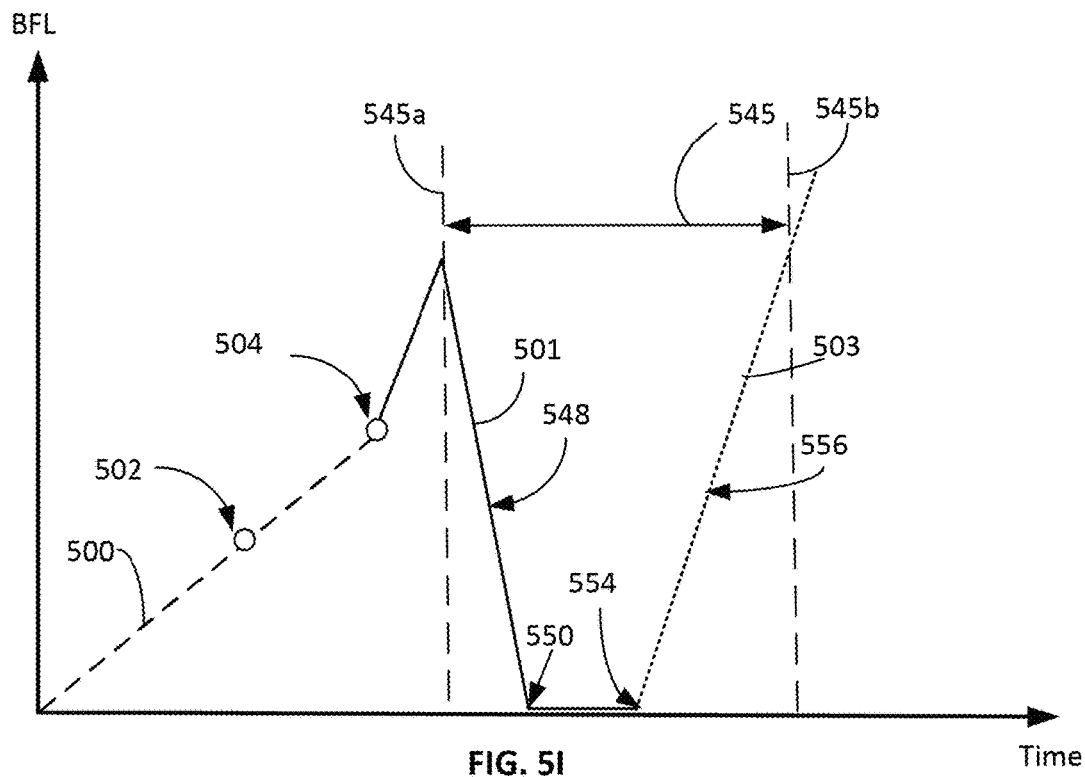
FIG. 5I is another graph illustrating exemplary buffer fill levels over time in response to certain exemplary factors.

FIG. 5I represents a similar scenario as the scenario depicted in FIG. 5H except that at ref 554, the receiving system 10\* begins operating in accordance with an expedited delivery mode to "recover" the buffer fill level as indicated by ref 556. Note that the buffer fill level is recovered in expedited delivery mode 503. Because an expedited delivery mode 503 is employed, the recover begins before idle network capacity becomes available (e.g., the recovery, as indicated by ref 556, is located between lines 545a and 545b when there is no idle network capacity).

Figure 5J:
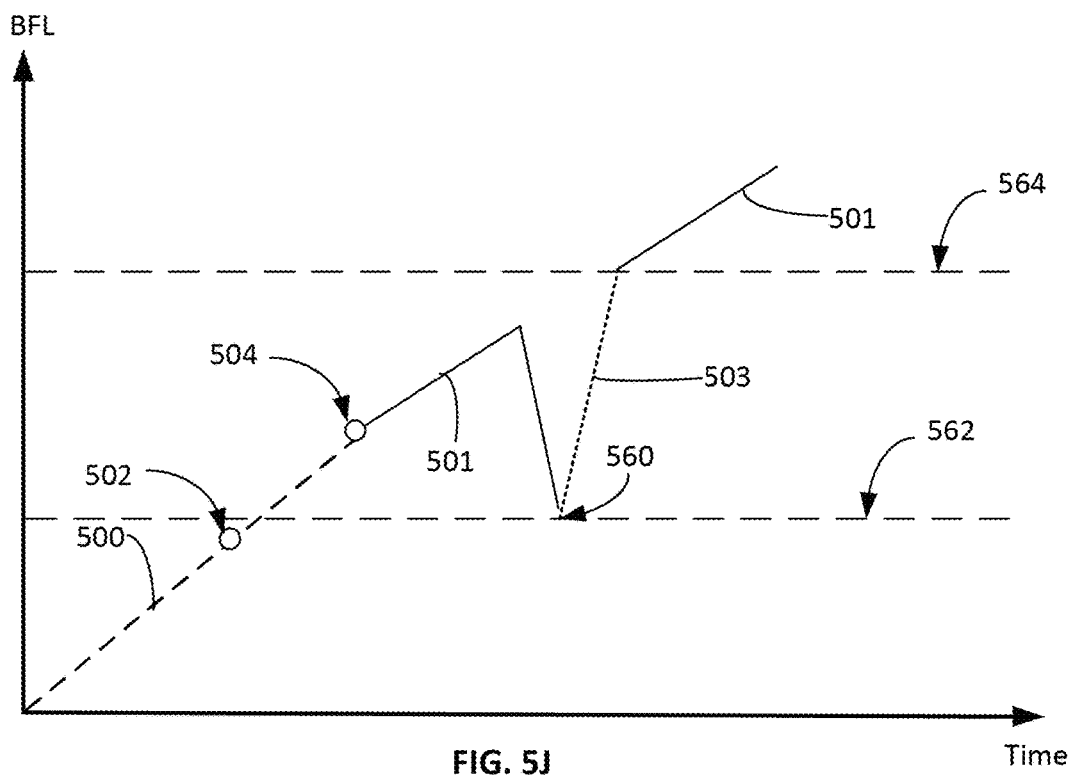
FIG. 5J is another graph illustrating exemplary buffer fill levels over time in response to certain exemplary factors.

FIG. 5J represents a scenario in which after the receiving system 10\* has begun operating in accordance with the second content streaming mode 501, a triggering event (as indicated by ref 560) has occurred (e.g., the sudden drop of the buffer fill level to a certain predefined level as indicated by ref 562) at which time the receiving system 10\* switches to an expedited delivery mod 503 in order to recover the fill level of the buffer. However, once the buffer fill level has reached another predefined level (ref 564), the receiving system 10\* reverts back to the second content streaming mode 501.

Although aspects of the present technology have been described with respect to specific examples, embodiments of the present technology are not limited by these examples. For example, persons of skill in the art will recognize that downloading of data by conditionally using idle network capacity may be performed according to various other algorithms and processes without departing from the scope or spirit of the present technology.

What is claimed is:

1. A method, comprising:
   downloading from a network and into a buffer a first portion of media content in accordance with a first content streaming mode when a fill level of the buffer is less than a threshold level, where the first content streaming mode includes downloading the first portion of media content regardless of the availability of idle network capacity;
   determining that the fill level of the buffer is greater than the threshold level; and
   downloading from the network and into the buffer a second portion of the media content in accordance with a second content streaming mode when the fill level of the buffer is determined to be greater than the threshold level, where the second content streaming mode includes selectively downloading the second portion of the media content over the idle network capacity.

2. The method of claim 1, wherein downloading from the network and into the buffer the first portion of media content in accordance with the first content streaming mode comprises:
   downloading from the network and into the buffer the first portion of media content in accordance with the first content streaming mode that competes for network capacity shared by other users of the network.

3. The method of claim 1, wherein downloading from the network and into the buffer the first portion of media content in accordance with the first content streaming mode comprises:
   transmitting a request to download at least the first portion of the media content in accordance with the first content streaming mode.

4. The method of claim 1, further comprising:
   determining that the buffer fill level is greater than another threshold level; and
   consuming media content stored in the buffer when the buffer fill level has been determined to be greater than filled to the another threshold level.

5. The method of claim 1, further comprising:
   consuming media content stored in the buffer when the fill level of the buffer has been determined to be greater than the threshold level.

6. The method of claim 1, wherein downloading from the network and into the buffer the second portion of media content in accordance with the second content streaming mode comprises:
determining that the network has the idle network capacity available.

7. The method of claim 1, wherein downloading from the network and into the buffer the second portion of media content in accordance with the second content streaming mode comprises:
increasing a storage capacity of the buffer.

8. The method of claim 1, further comprising:
detecting an occurrence of a triggering event; and
downloading from the network and into the buffer a third portion of the media content in accordance with an expedited delivery mode when the triggering event is detected, where the expedited delivery mode includes downloading the third portion of the media content when the idle network capacity is determined to be unavailable.

9. The method of claim 8, wherein detecting the occurrence the triggering event comprises:
detecting that the fill level of the buffer has fallen to or below a refresh level.

10. The method of claim 8, wherein detecting the occurrence of a triggering event comprises:
detecting that the fill level of the buffer is decreasing at a drop rate that is greater than a permitted maximum drop rate.

11. The method of claim 8, wherein downloading from the network and into the buffer the third portion of the media content in accordance with the expedited delivery mode comprises:
downloading from the network and into the buffer the third portion of the media content in accordance with the first content streaming mode.

12. The method of claim 1, wherein the idle network capacity includes shared network capacity defined between a total capacity of the network and a current aggregate network traffic load, and
wherein the idle network capacity is available when the total capacity of the network is greater than the current aggregate network traffic load.

13. The method of claim 1, further comprising:
determining whether the idle network capacity is available,
wherein downloading, from the network and into the buffer, the second portion of the media content in accordance with the second content streaming mode when the fill level of the buffer is greater than the threshold level includes pausing the download of the second portion of the media content when the idle network capacity is unavailable.

14. A receiving system, comprising:
a buffer, a network interface, a user interface, one or more processors, and a data storage communicatively coupled with each other, the data storage storing non-transitory computer executable instructions that, when executed by the one or more processors, cause the receiving system to:
download from a network and into the buffer a first portion of media content in accordance with a first content streaming mode when a fill level of the buffer is less than a threshold level, where the first content streaming mode includes downloading the first portion of the media content regardless of the availability of idle network capacity;
determine that the fill level of the buffer is greater than the threshold level; and
download from the network and into the buffer a second portion of the media content in accordance with a second content streaming mode when the fill level of the buffer is determined to be greater than the threshold level, where the second content streaming mode includes selectively downloading the second portion of the media content data over the idle network capacity.

15. The receiving system of claim 14, wherein the computer executable instructions, when the computer executable instructions executed by the one or more processors, cause the receiving system to:
determine that the fill level of the buffer is greater than to another threshold level; and
consume media content stored in the buffer when the fill level of the buffer has been determined to be greater than to the another threshold level.

16. The receiving system of claim 14, wherein the computer executable instructions, when executed by the one or more processors, cause the receiving system to consume media content stored in the buffer when the fill level of the buffer has been determined to be greater than the threshold level.

17. The receiving system of claim 14, wherein to download from the network and into the buffer the second portion of media content in accordance with the second content streaming mode includes verifying that the network has the idle network capacity available.

18. The receiving system of claim 14, wherein to download from the network and into the buffer the second portion of media content in accordance with the second content streaming mode includes increasing a storage capacity of the buffer.

19. The receiving system of claim 14, wherein when executed by the one or more processors, cause the receiving system to detect an occurrence of a triggering event; and to download from the network and into the buffer a third portion of the media content in accordance with an expedited delivery mode when the triggering event is detected, where the expedited delivery mode includes downloading the third portion of the media content when the idle network capacity is unavailable.

20. A system, comprising:
a buffer;
a network interface;
a user interface;
one or more processors;
a content download system configured to download, from a network and into the buffer, a first portion of media content in accordance with a first content streaming mode when a fill level of the buffer below a predefined threshold level, where the first content streaming mode includes downloading the first portion of media content regardless of the availability of idle network capacity;
a buffer fill level determination component configured to determine that the buffer is above the predefined threshold level; and
wherein the content download system is further configured to download, from the network and into the buffer, a second portion of the media content in accordance with a second content streaming mode when the fill level of the buffer is determined to be above the predefined threshold level by the buffer fill level determination component, and wherein the second content streaming mode includes selectively downloading the second portion of the media content over the idle network capacity.

* * * * *